United States Patent
Hayashi et al.

(10) Patent No.: US 12,319,358 B2
(45) Date of Patent: Jun. 3, 2025

(54) STEERING ASSEMBLY

(71) Applicant: YAMAHA HATSUDOKI KABUSHIKI KAISHA, Shizuoka (JP)

(72) Inventors: Tomoyuki Hayashi, Shizuoka (JP); Luis Mayorca, Live Oak, FL (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/403,376

(22) Filed: Jan. 3, 2024

(65) Prior Publication Data

US 2024/0246600 A1 Jul. 25, 2024

Related U.S. Application Data

(60) Provisional application No. 63/481,550, filed on Jan. 25, 2023.

(51) Int. Cl.
*B62D 1/12* (2006.01)
*B62D 3/12* (2006.01)
*B62D 7/16* (2006.01)

(52) U.S. Cl.
CPC .............. *B62D 3/126* (2013.01); *B62D 7/163* (2013.01)

(58) Field of Classification Search
CPC .......... B62D 3/126; B62D 7/163; B62D 3/02; B62D 5/001; B62D 7/14; B62D 7/10; B62D 7/12; B62D 7/13
See application file for complete search history.

(56) References Cited

U.S. PATENT DOCUMENTS

| | | | | |
|---|---|---|---|---|
| 6,070,891 | A * | 6/2000 | Knautz | B62D 3/12 280/93.514 |
| 9,283,985 | B2 * | 3/2016 | Schroeder | B62D 3/12 |
| 9,783,224 | B1 * | 10/2017 | Roberts | B62D 9/00 |
| 10,442,458 | B2 | 10/2019 | Heon et al. | |
| 10,730,544 | B2 | 8/2020 | Heon et al. | |
| 2006/0043690 | A1 * | 3/2006 | Pankau | B62D 3/12 280/93.502 |
| 2006/0231323 | A1 * | 10/2006 | Rosenfeld | B62D 5/22 180/428 |
| 2015/0197273 | A1 * | 7/2015 | Schroeder | B62D 3/126 74/422 |
| 2016/0347350 | A1 * | 12/2016 | Heon | B60G 13/001 |

(Continued)

*Primary Examiner* — Zakaria Elahmadi
(74) *Attorney, Agent, or Firm* — Global IP Counselors, LLP

(57) ABSTRACT

A steering assembly basically includes a steering gearbox, a bracket, a rotational motion restriction structure, and a translational motion restriction structure. The steering gearbox includes a housing and a steering rack. The steering rack has a first rack end and a second rack end. The bracket is coupled to the first rack end. The bracket includes a first tie rod connection located axially inward of the first rack end and the second rack end with respect to a longitudinal center axis of the steering rack. The rotational motion restriction structure is configured to restrict rotational movement of the bracket relative to the longitudinal center axis of the steering rack. The translational motion restriction structure is configured to limit translational movement of the steering rack along the longitudinal center axis of the steering rack. The rotational motion restriction structure and the translational motion restriction structure are located at different locations.

14 Claims, 23 Drawing Sheets

(56) References Cited

U.S. PATENT DOCUMENTS

| | | | | |
|---|---|---|---|---|
| 2019/0248405 A1* | 8/2019 | Bennett | ................... | B62D 3/126 |
| 2020/0317262 A1* | 10/2020 | Sovern | ................... | F16H 19/04 |
| 2021/0146990 A1* | 5/2021 | Kim | ................... | B62D 5/0424 |
| 2022/0306205 A1* | 9/2022 | Ito | ................... | B62D 3/126 |

\* cited by examiner

STEERING ASSEMBLY

CROSS-REFERENCE TO RELATED APPLICATIONS

This application claims the benefit of U.S. Provisional Application No. 63/481,550, filed on Jan. 25, 2023. The entire disclosure of U.S. Provisional Application No. 63/481,550 is hereby incorporated herein by reference.

BACKGROUND

Technical Field

This disclosure generally relates to a steering assembly. More specifically, the present disclosure relates to a steering assembly for a vehicle.

Background Information

Generally, recreational off-highway vehicles are designed to be operated over rough terrain. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. These recreational off-highway vehicles are often driven on uneven terrain such as rough roads, steep inclines and declines. As a consequence of these considerations, the design of a recreational off-highway vehicle can be quite different from vehicles designed for driving on paved roads.

Various types of recreational off-highway vehicles that are designed to be primarily driven on unpaved surfaces and typically have one or more seats. One example of a recreational off-highway vehicles is a side-by-side off-road vehicle in which the driver and a passenger are seated side-by-side. Some side-by-side recreational off-road vehicles also have a second row of seats to accommodate one or more additional passengers. These recreational off-highway vehicles typically have a frame with an open cockpit, a rollover protection structure, a steering wheel and four wheels. In the case of these side-by-side recreational off-highway vehicles, a drive source such as an internal combustion engine is utilized to drive one or more of the wheels. Typically, the drive source will be configured to drive two of the wheels or all four of the wheels. Typically, the engine is provided with a transmission that transfers power to an output shaft from a crankshaft of the engine. The output shaft drives the wheels through a drivetrain.

SUMMARY

Generally, the present disclosure is directed to various features of a steering assembly for a recreational off-highway vehicle. In driving various recreational off-highway vehicles on rough terrains, it has been found that it is desirable to have a large wheel travel (i.e., vertical movement of the tires) for larger-sized tires to handle the rough terrain. The steering assembly provided for turning steerable wheels is operatively coupled to the steerable wheels via tie rods. To accommodate the wheel travel of the steerable wheels, the tie rods are connected to the steering assembly via joints or bearings, such as ball joints. However, such joints typically trade working angle (i.e., range of motion) for strength or stability (i.e., ball pop-out resistance). Thus, it is difficult to achieve a larger wheel travel, which requires a larger working angle of the joints, for larger-sized tires, which are heavier and require greater strength.

One object of the present disclosure is directed to an improved steering assembly.

In view of the state of the known technology and in accordance with one aspect of the present disclosure, a steering assembly is provided that basically comprises a steering gearbox, a bracket, a rotational motion restriction structure, and a translational motion restriction structure. The steering gearbox includes a housing and a steering rack movably disposed with respect to the housing in a lateral direction. The steering rack has a first rack end and a second rack end. The bracket is coupled to the first rack end of the steering rack. The bracket includes a first tie rod connection located axially inward of the first rack end and the second rack end with respect to a longitudinal center axis of the steering rack. The rotational motion restriction structure is configured to restrict rotational movement of the bracket relative to the longitudinal center axis of the steering rack. The translational motion restriction structure is configured to limit translational movement of the steering rack along the longitudinal center axis of the steering rack. The rotational motion restriction structure and the translational motion restriction structure are located at different locations.

Also, other objects, features, aspects and advantages of the disclosed steering assembly will become apparent to those skilled in the art from the following detailed description, which, taken in conjunction with the annexed drawings, discloses preferred embodiments of the steering assembly.

BRIEF DESCRIPTION OF THE DRAWINGS

Referring now to the attached drawings which form a part of this original disclosure.

It should be noted that these figures are intended to illustrate the general characteristics of methods, structure and/or materials utilized in certain illustrative embodiment and to supplement the written description provided below. These figures are to reduce scale of the actual recreational off-highway vehicle but may not precisely reflect the precise structural or performance characteristics of any given embodiment. However, the dimensional relationships and the arrangement of the parts of the recreational off-highway vehicle are accurately depicted.

DETAILED DESCRIPTION OF EMBODIMENTS

Selected embodiments will now be explained with reference to the drawings. It will be apparent to those skilled in the recreational vehicle field from this disclosure that the following descriptions of the embodiments are provided for illustration only and not for the purpose of limiting the invention as defined by the appended claims and their equivalents.

Referring initially to FIGS. 1 to 7, a vehicle 10 is illustrated in accordance with one illustrative embodiment. Here, the vehicle 10 is a side-by-side recreational off-highway vehicle with rear seating for four people. As used herein, the term "recreational off-highway vehicle" refers to a vehicle that is not street legal (i.e. the off-highway vehicle is not equipped and licensed for use on public road). Of course, recreational off-highway vehicles such as the recreational off-highway vehicle 10 illustrated herein can be also driven on paved surfaces. In other words, in the illustrated embodiment, the vehicle 10 can be classified as a "recreational off-highway vehicle". Hereinafter, for the sake of brevity, the recreational off-highway vehicle 10 will be referred to simply as the vehicle 10.

Figure 4:
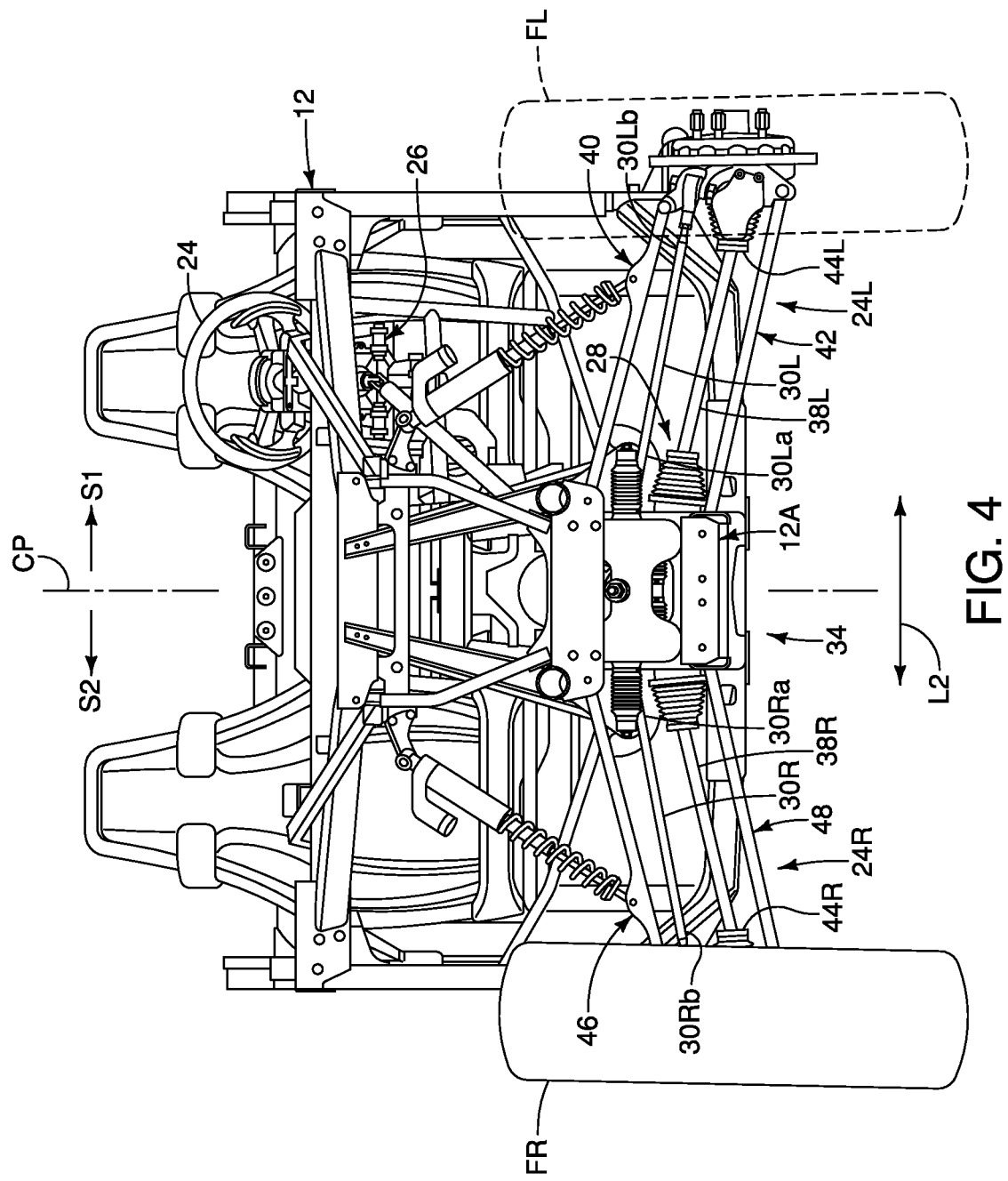
FIG. 4 is a partial front end elevational view of selected parts of the recreational off-highway vehicle illustrated in FIG. 1.
Figure 5:
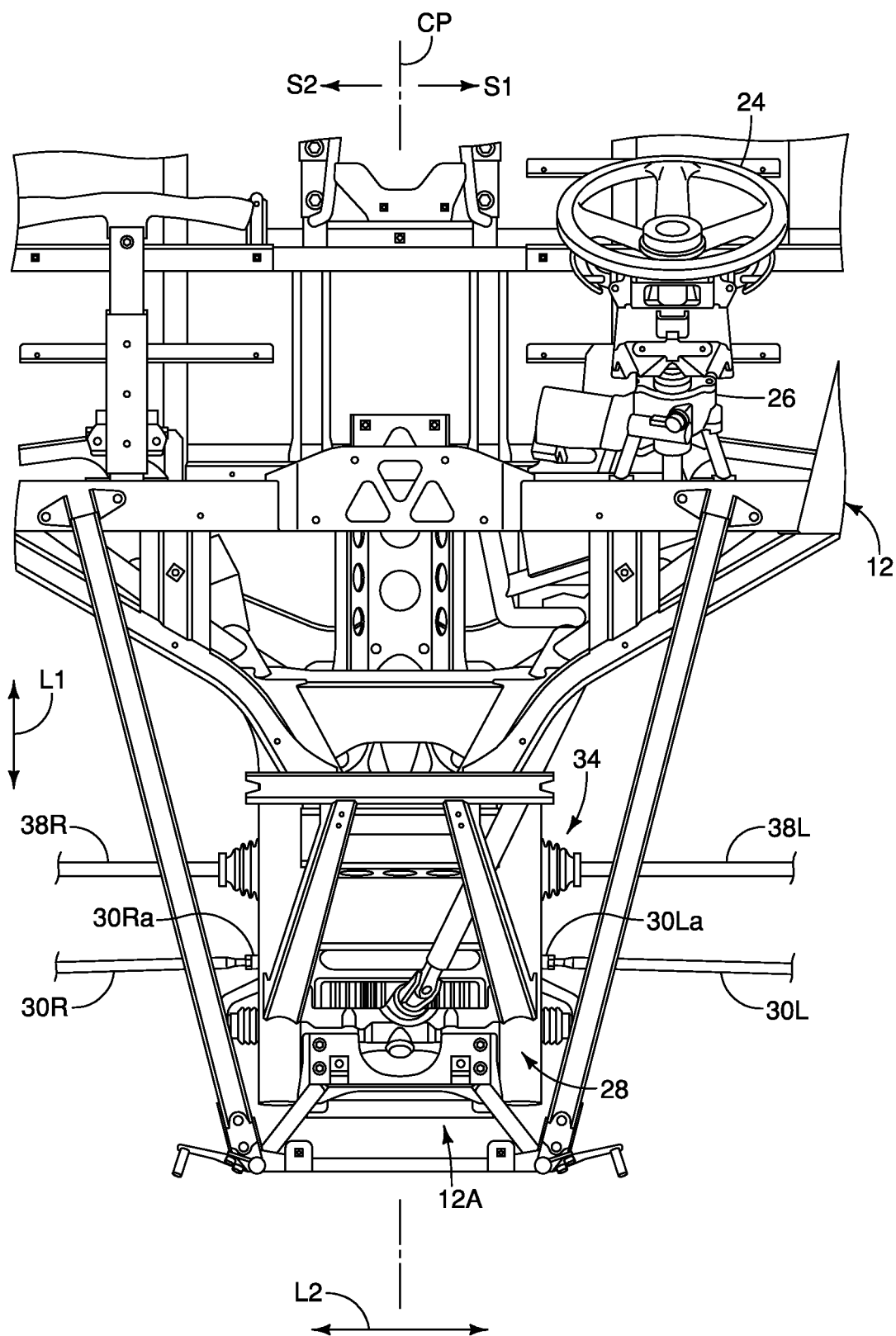
FIG. 5 is a partial top view of selected parts of the recreational off-highway vehicle illustrated in FIG. 1.
Figure 6:
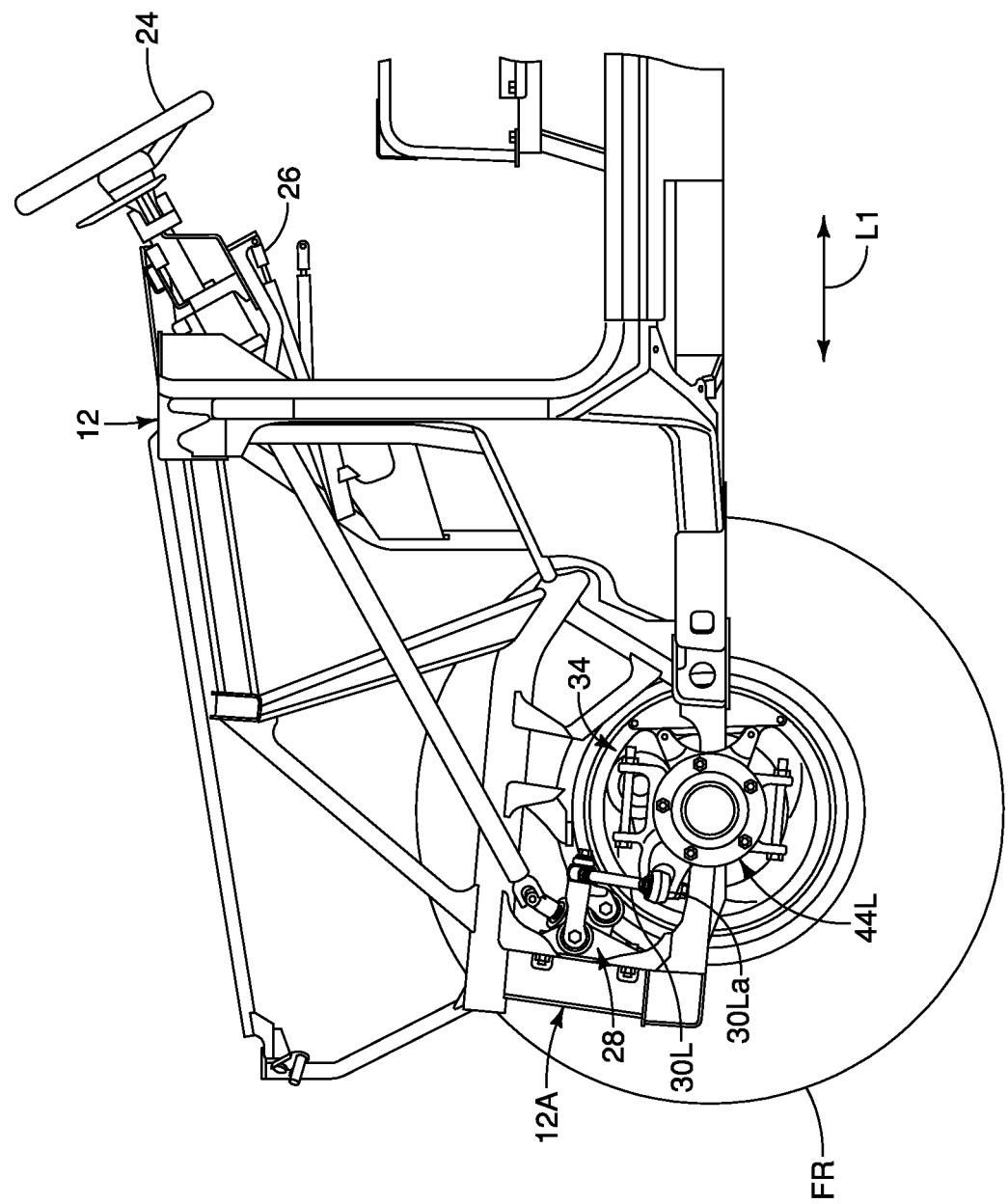
FIG. 6 is a partial left side elevational view of selected parts of the recreational off-highway vehicle illustrated in FIG. 1.
Figure 7:
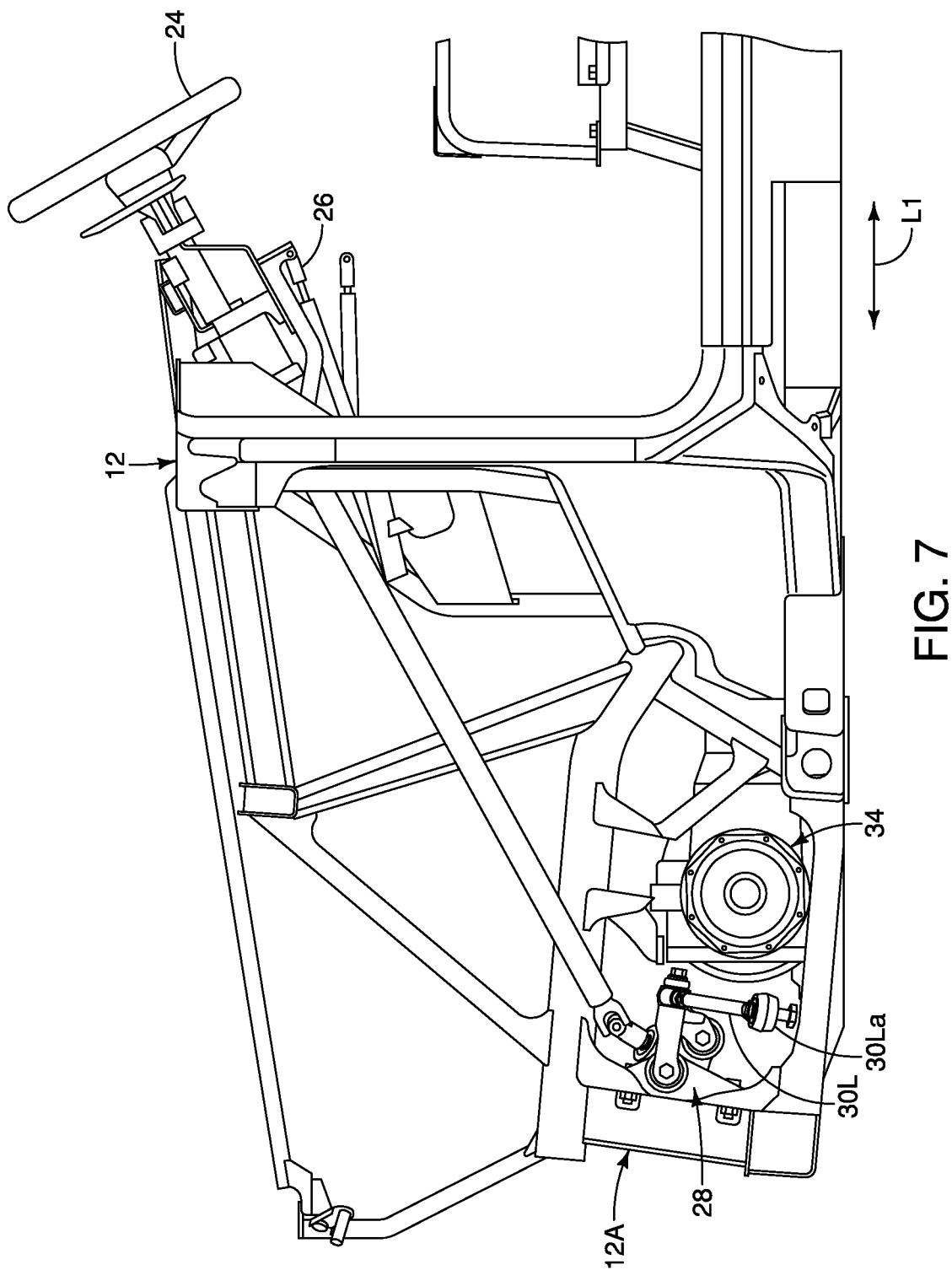
FIG. 7 is a partial left side elevational view of selected parts of the recreational off-highway vehicle illustrated in FIG. 1.
Figure 8:
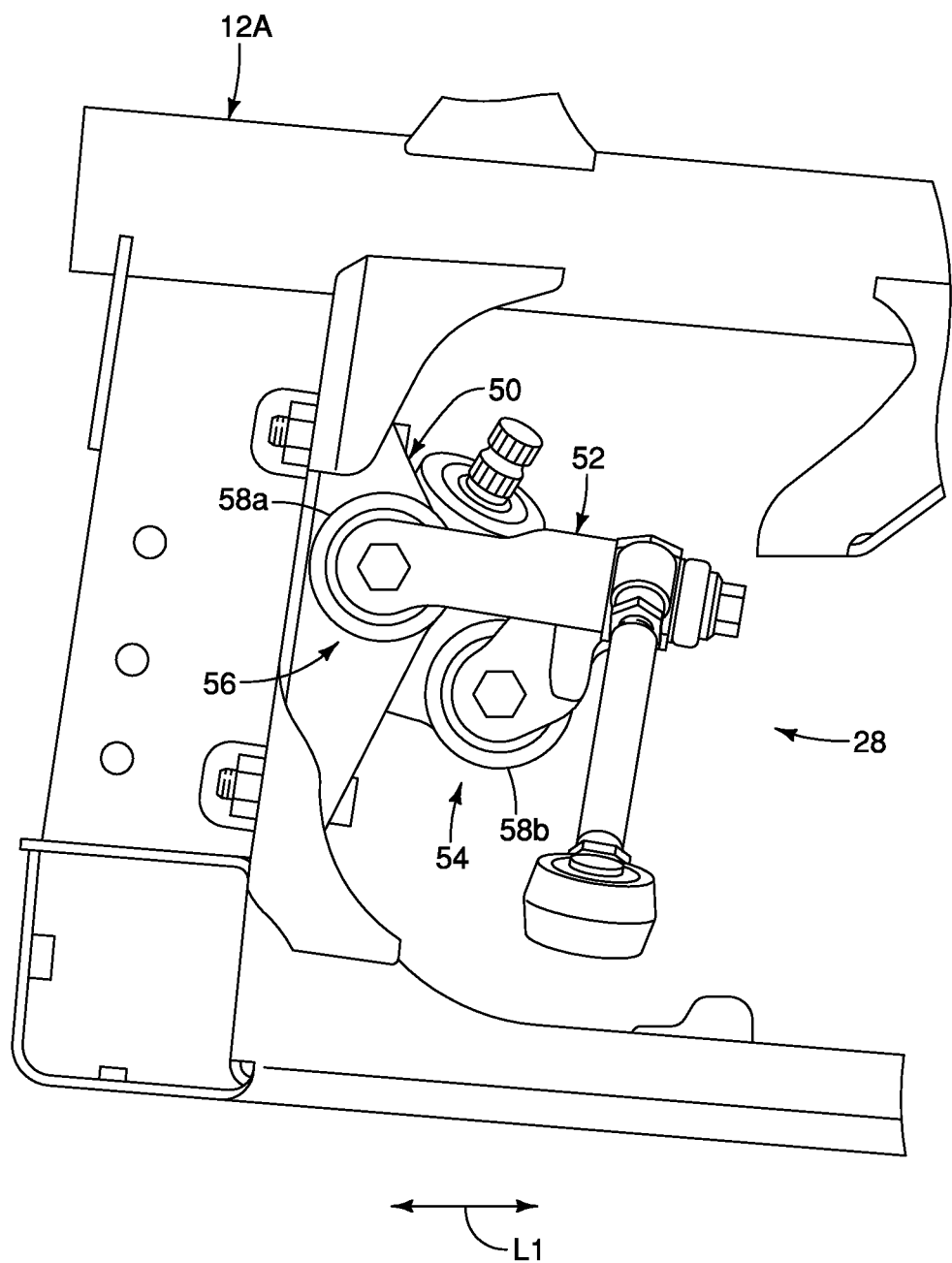
FIG. 8 is a left side elevational view of a steering assembly of the recreational off-highway vehicle illustrated in FIG. 1, illustrating a state in which the steering assembly is fixedly coupled to a front portion of a vehicle frame of the recreational off-highway vehicle.

In the following description, the terms "front" and "forward" refer to a direction in which the driver looks straight ahead while in seated driving position. Also, in the following description, the terms "rear," "rearward" and "backward" refer to a direction opposite to the front or forward direction. Further in the following description, the term "lateral side" refer to a portion of the vehicle 10 that is one or the other side of a vertical center plane CP that bisect the vehicle 10 into right and left halves, as seen in FIG. 4. Thus, as seen in FIG. 4, the vertical center plane CP divides the vehicle 10 into a first lateral side S1 (i.e., the left side in the illustrated embodiment) and a second lateral side S2 (i.e., the right side in the illustrated embodiment). The vertical center plane CP extends in a longitudinal vehicle direction L1 of the vehicle 10 as indicated in FIG. 5. Also, the vertical center plane CP extends perpendicular to a lateral vehicle direction L2 of the vehicle as indicated in FIG. 5. In the following description, the term "lateral vehicle direction" or "lateral direction" refer to a side to side direction that is perpendicular to a straightforward driving direction and "longitudinal vehicle direction" refers a direction that is parallel to a straightforward driving direction.

Figure 1:
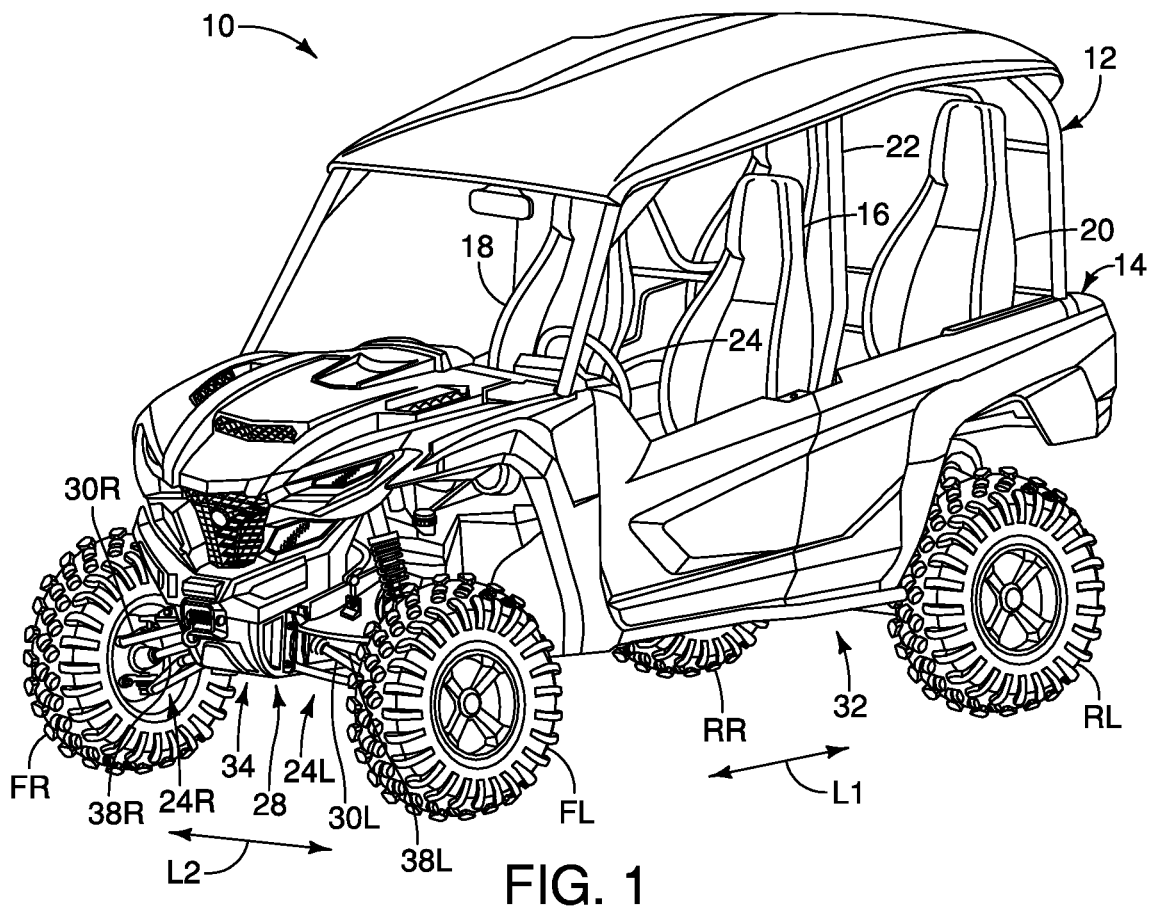
FIG. 1 is a perspective view of a recreational off-highway vehicle having a steering assembly in accordance with one illustrative embodiment.
Figure 2:
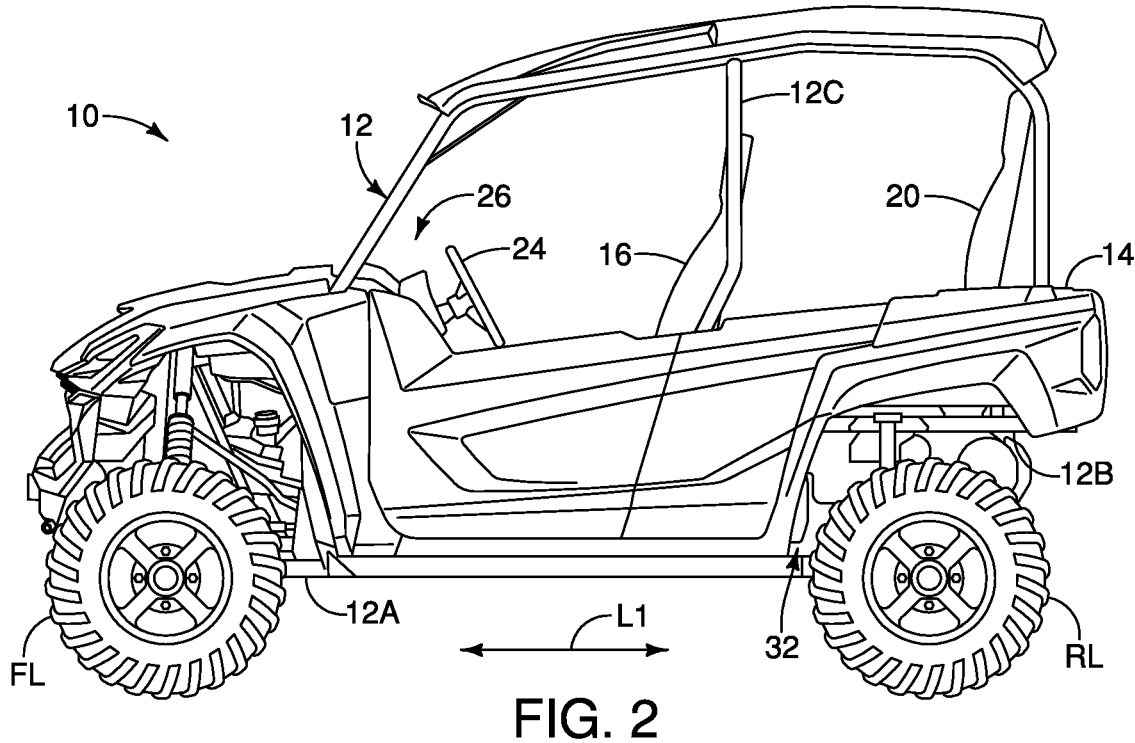
FIG. 2 is a left side elevational view of the recreational off-highway vehicle illustrated in FIG. 1.
Figure 3:
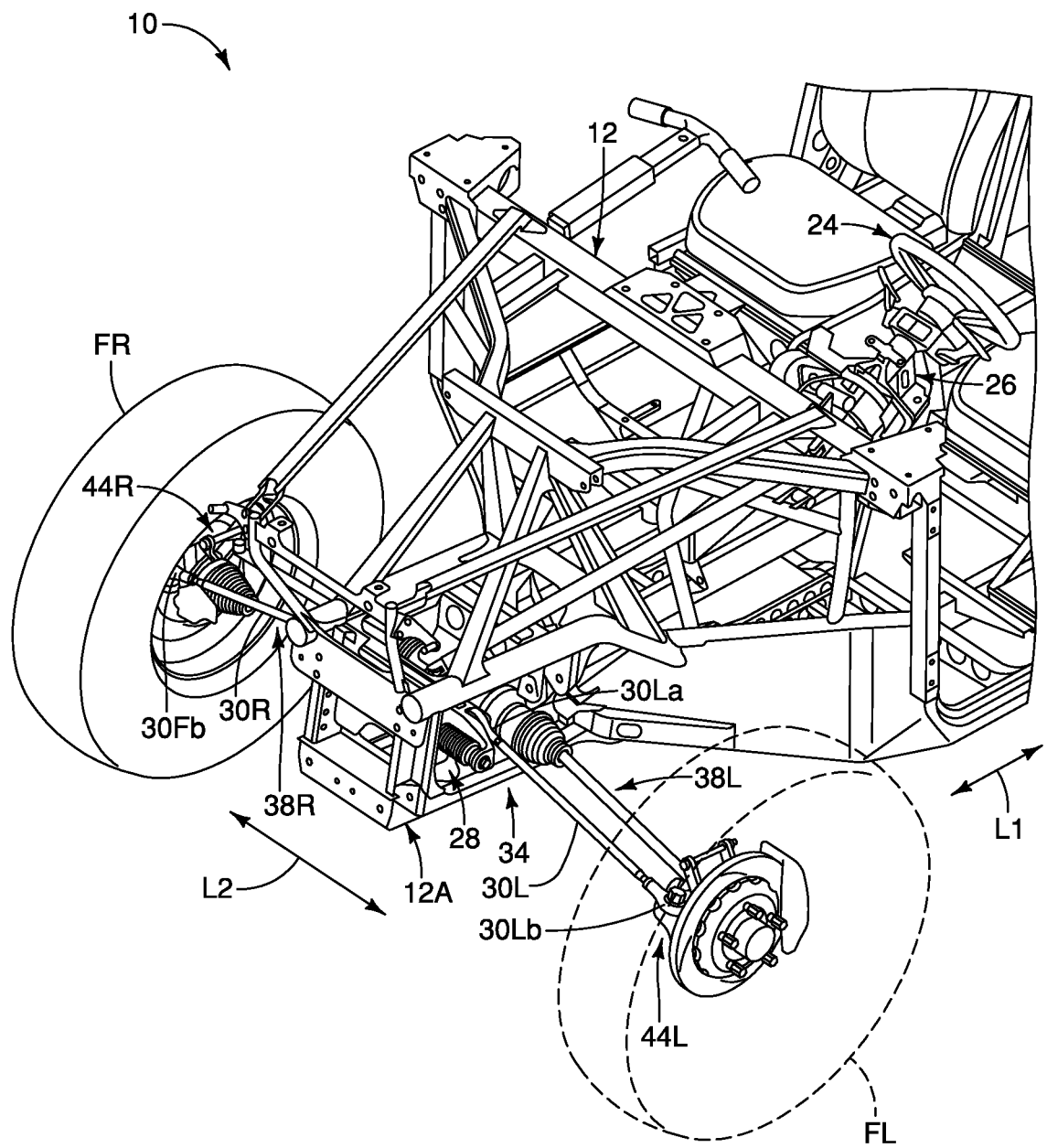
FIG. 3 is a partial perspective view of selected parts of the recreational off-highway vehicle illustrated in FIG. 1.

As seen in FIGS. 1 and 2, the vehicle 10 basically comprises a vehicle frame 12, a vehicle body 14, a pair of front wheels FR and FL a pair of rear wheels RR and RL, a driver seat 16, a front passenger seat 18, a first rear passenger seat 20 and a second rear passenger seat 22. The vehicle body 14, the seats 16, 18, 20 and 22 are attached to the vehicle frame 12 in a conventional manner. The front wheels FR and FL are connected to the vehicle frame 12 by a pair of independent front suspensions 24R and 24L, while the rear wheels RR and RL are connected to the vehicle frame 12 by a pair of independent rear suspensions (not shown) in a conventional manner. While the vehicle 10 includes four seats, it is contemplated that the vehicle 10 can have only one seat or two seats.

Also, the vehicle 10 further comprises a steering wheel 24 that is disposed in front of the driver seat 16. The steering wheel 24 is operatively connected to the front wheels FR and FL by a steering column 26 via a steering assembly 28 for turning the front wheels FR and FL in response to turning of the steering wheel 24. In some applications, a control stick can be used in place of the steering wheel 24. Other suitable steering devices also can be used, such as, without limitation, a handlebar, one or more push-buttons, one or more foot pedals and/or the like. The steering assembly 28 is operatively coupled to the left front wheel FL via a left tie rod 30L and operatively coupled to the right front wheel FR via a right tie rod 30R. Thus, here, the front wheels FR and FL are steerable wheels for changing the travel path of the vehicle 10.

The vehicle frame 12 is typically made from a plurality of hollow tubes and a plurality of brackets that are welded to each other. Of course, alternatively or additionally, these hollow tubes and brackets can be bolted together to form the vehicle frame 12. It is contemplated that at least some of the hollow tubes could be replaced by other types of supports such as solid support members and/or beams. While the hollow tubes have a cylindrical cross-section, it is contemplated that cross-sections other than circular. Preferably, the hollow tubes, the beams and the brackets are preferably made of a suitable rigid metallic material such as steel, aluminum, titanium, etc. It is also contemplated that at least some of the hollow tubes, the beams, and the brackets could be made of a non-metallic material, such as reinforced composite materials such as fiber reinforced plastics. It is also contemplated that at least some of the members and brackets could be joined to each other by means other than welding, such as by fastening and bonding for example. It is also contemplated that two or more of the hollow tubes, the beams, and the brackets described below could be cast or otherwise formed as a single component. It is also contemplated that the vehicle frame 12 could have more or less the hollow tubes, the beams, and the brackets than illustrated below depending on the type of materials used, the required strength and rigidity of the vehicle frame 12 and the weight of the components attached to the vehicle frame 12 for example.

As seen in FIGS. 1 and 2, the vehicle body 14 is provided to the vehicle frame 12 in a conventional manner. The vehicle frame 12 has a front frame 12A, a rear frame 12B and an intermediate frame 12C defining an open passenger compartment between the front and rear frames 12A and 12B. The front wheels FR and FL support the front frame 12A of the vehicle frame 12 by the front suspensions 24R and 24L. The rear wheels RR and RL supports the rear frame 12B of the vehicle frame 12 by the rear suspensions (not shown). The vertical center plane CP is equally spaced from the wheels FR and FL.

As seen in FIG. 1, the vehicle body 14 is supported by the vehicle frame 12 in a conventional manner. The vehicle body 14 includes a plurality of body panels that are connected the vehicle frame 12. The body panels of the vehicle body 14 aid in protecting various components of the vehicle 10 and provide some of the aesthetic features of the vehicle 10. In some applications of the vehicle 10, the vehicle body 14 can be omitted.

The vehicle 10 also includes a drive source 32 that is supported on the vehicle frame 12. Basically, the drive source 32 is an internal combustion engine. However, the drive source 32 can be an electric motor. Here, the drive source 32 is primarily located between the driver seat 16 and the front passenger seat 18. The first and second rear passenger seats 20 and 22 are located rearward of the drive source 32. The drive source 32 is operatively coupled to at least one of the wheels FR, FL, RR and RL which is a drive wheel. Preferably, the vehicle 10 is a four-wheel drive vehicle in which both the front wheels FR and FL and the rear wheels RR and RL are drive wheels for propelling the vehicle 10 along the ground. Of course, it will be apparent from this disclosure that only the rear wheels RR and RL or only the front wheels FR and FL can be drive wheels. Here, the drive source 32 is operatively coupled to all of the wheels FR, FL, RR and RL via a drive train (not shown).

In the case of the front wheels FR and FL, a front differential 34 is provided on the vehicle frame 12, as seen in FIGS. 3 to 7. The front differential 34 is connected to the drive source 32 by a propeller shaft (not shown) and to the front wheels FR and FL by a pair of drive shafts 38R and 38L. In the illustrated embodiment, the front differential 34 is provided on the vehicle frame 12 at a location rearward and below of the steering assembly 28.

As seen in FIG. 4, each of the left and right front suspensions 24L and 24R is independently swingable (up and down) relative to the vehicle frame 12. In this way, the front wheels FL and FR are independently suspended by the left and right front suspensions 24L and 24R, respectively, to move relative to the vehicle frame 12 for upward and downward movements in a vertical direction. Also, the left and right front suspensions 24L and 24R are configured to allow the front wheels FL and FR to be turned for steering the vehicle 10 in a left direction and a right direction. The left and right front suspensions 24L and 24R are each a double A-arm suspension assembly, for example. Basically, as seen in FIG. 4, the left front suspension 24L includes an upper suspension arm 40 pivotally coupled to the vehicle frame 12 and a lower suspension arm 42 pivotally coupled to the vehicle frame 12. The outboard ends of the upper suspension arm 40 and the lower suspension arm 42 are coupled together by a knuckle 44L. Similarly, the right front suspension 24R includes an upper suspension arm 46 pivotally coupled to the vehicle frame 12 and a lower suspension arm 48 pivotally coupled to the vehicle frame 12. The outboard ends of the upper suspension arm 46 and the lower suspension arm 48 are coupled together by a knuckle 44R.

In the illustrated embodiment, the left front suspension 24L further includes a front shock absorber that is coupled between the vehicle frame 12 and the upper suspension arm 40, while the right front suspension 24R further includes a front shock absorber that is coupled between the vehicle frame 12 and the upper suspension arm 44. Each of the shock absorbers is a conventional shock absorber that includes a coil spring disposed around a nitrogen gas shock with a separate reservoir connected to the nitrogen gas shock. Since shock absorbers of this type are well known, the shock absorbers will not be described in greater detail.

As seen in FIG. 4, the knuckle 44L is pivotally supported on the outbound ends of the upper suspension arm 40 and the lower suspension arm 42. Similarly, the knuckle 44R is pivotally supported on the outbound ends of the upper suspension arm 46 and the lower suspension arm 48. The knuckles 44L and 44R are turned in response to the steering wheel 24 being turned. In particular, turning motion of the steering wheel 24 is converted to translation motion of the tie rods 30L and 30R via the steering assembly 28 in the lateral vehicle direction L2, which turns the knuckles 44L and 44R, respectively. In particular, the tie rod 30L has a first end 30La and a second end 30Lb. The first end 30La is operatively coupled to the steering assembly 28 via a joint or bearing, such as a ball joint or rod end bearing, while the second end 30Lb is pivotally coupled to the knuckle 44L via a joint or bearing, such as a ball joint or rod end bearing. Similarly, the tie rod 30R has a first end 30Ra and a second end 30Rb. The first end 30Ra is operatively coupled to the steering assembly 28 via a joint or bearing, such as a ball joint or rod end bearing, while the second end 30Rb is pivotally coupled to the knuckle 44R via a joint or bearing, such as a ball joint or rod end bearing.

Referring now to FIGS. 8 to 25, the steering assembly 28 will be explained in more detail. As seen in FIGS. 8 to 12, the steering assembly 28 includes a steering gearbox 50, a bracket 52, a rotational motion restriction structure 54, and a translational motion restriction structure 56. Also, the steering assembly 28 also includes a pair of steering rack boots 58a and a pair of slide shaft boots 58b.

As seen in FIGS. 13 to 22, the steering gearbox 50 includes a housing 60 and a steering rack 62. The steering gearbox 60 also includes a steering pinion 64. The housing 60 has a housing body 66, a mount base 68, and a holder 70. The housing 60 is made of a suitable rigid metallic material, such as cast iron, steel, aluminium, titanium, etc. The housing body 66, the mount base 68 and the holder 70 of the housing 60 are preferably cast or otherwise formed as a one-piece, unitary member. The housing body 66 is a hollow member with a first or left axial end 66a, a second or right axial end 66b and an inner bore 66c (see FIG. 19) extending between the first axial end 66a and the second axial end 66b. The housing body 66 also includes a pinion housing section 66d. The pinion housing section 66d is a hollow section in which the steering pinion 64 is rotatably disposed. The pinion housing section 66d protrudes from the housing body 66 and communicates to the inner bore 66c of the housing body 66 such that the steering pinion 64 mates with the steering rack 62. The mount base 68 extends both upward and downward from the housing body 66. The mount base 68 has a plurality of (four in the illustrated embodiment) through holes 68a for receiving bolts to fixedly couple the steering gearbox 50 to the front frame 12A of the vehicle frame 12. The holder 70 extends radially outwardly from an outer peripheral surface 66e of the housing body 66 with respect to a longitudinal center axis of the inner bore 66c of the housing body 66. The holder 70 is also axially located at a middle portion of the housing body 66 between the first axial end 66a and the second axial end 66b. The holder 70 is a hollow member with a first or left axial end 70a, a second or right axial end 70b and an inner bore 70c (see FIG. 20) extending between the first axial end 70a and the second axial end 70b. The holder 70 is arranged relative to the housing body 66 such that a longitudinal center axis of the inner bore 70c of the holder 70 extends parallel to the longitudinal center axis of the inner bore 66c of the housing body 66.

Figure 9:
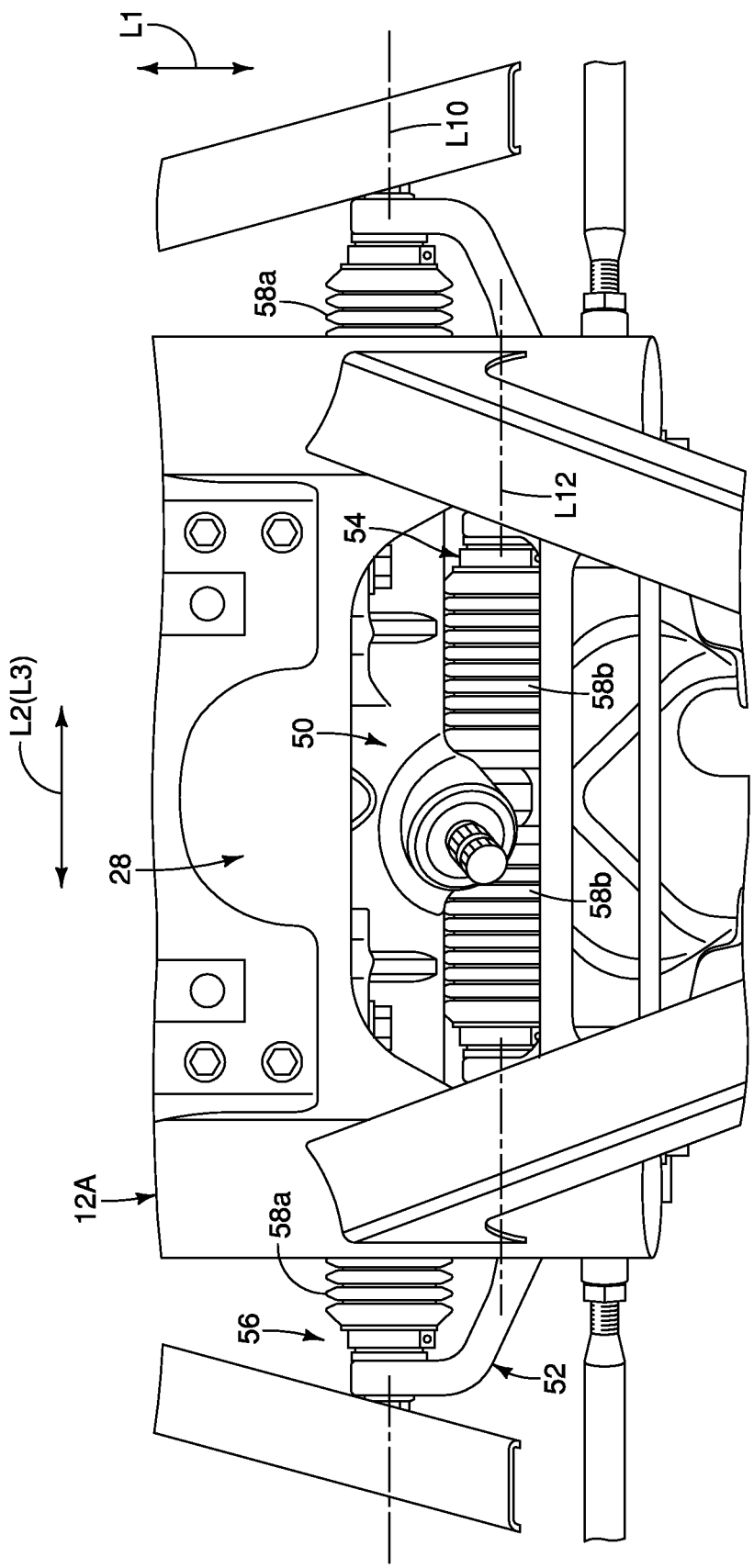
FIG. 9 is a top normal view of the steering assembly of the recreational off-highway vehicle illustrated in FIG. 1, illustrating the state in which the steering assembly is fixedly coupled to the front portion of the vehicle frame of the recreational off-highway vehicle.
Figure 10:
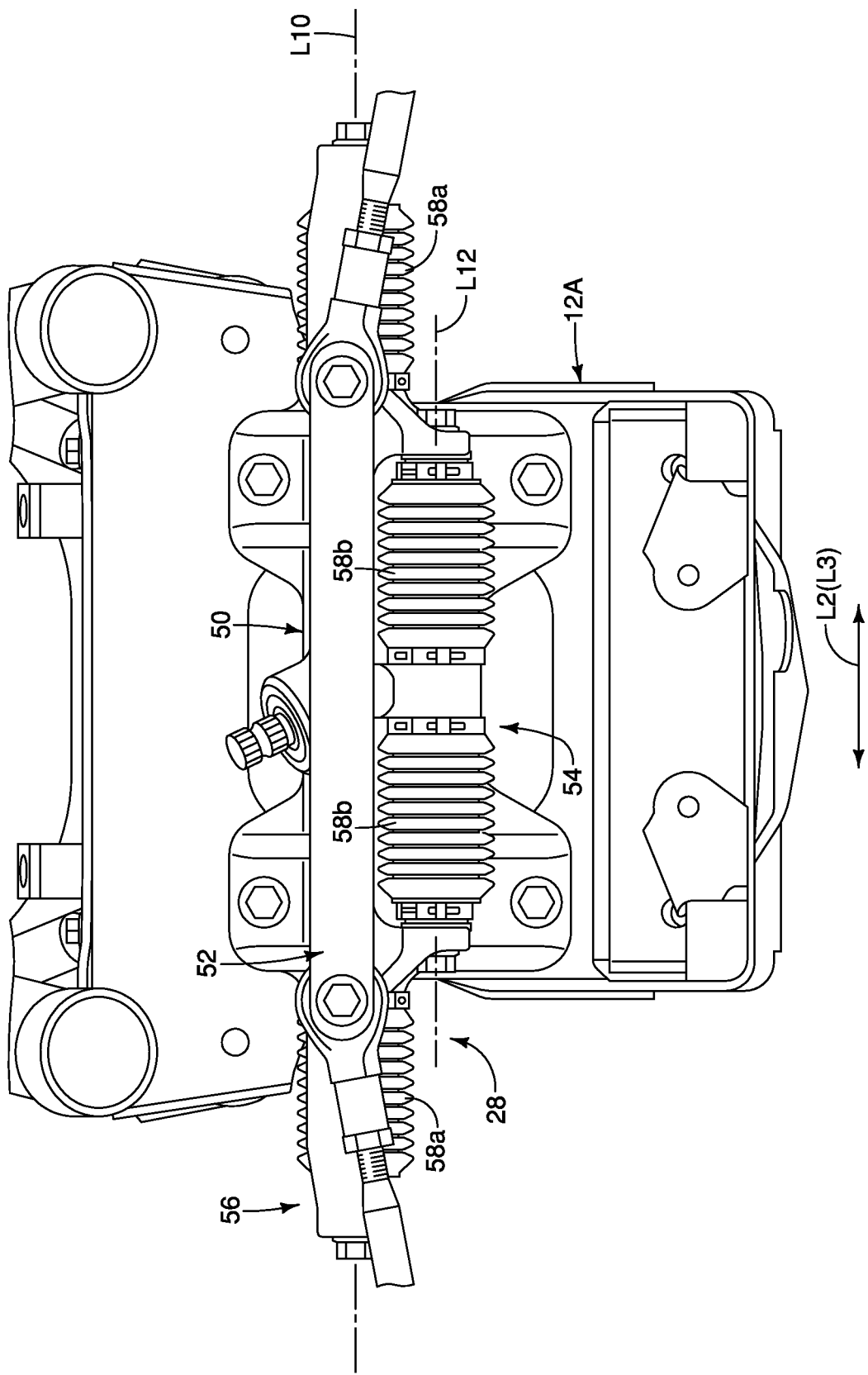
FIG. 10 is a rear normal view of the steering assembly of the recreational off-highway vehicle illustrated in FIG. 1, illustrating the state in which the steering assembly is fixedly coupled to the front portion of the vehicle frame of the recreational off-highway vehicle.
Figure 11:
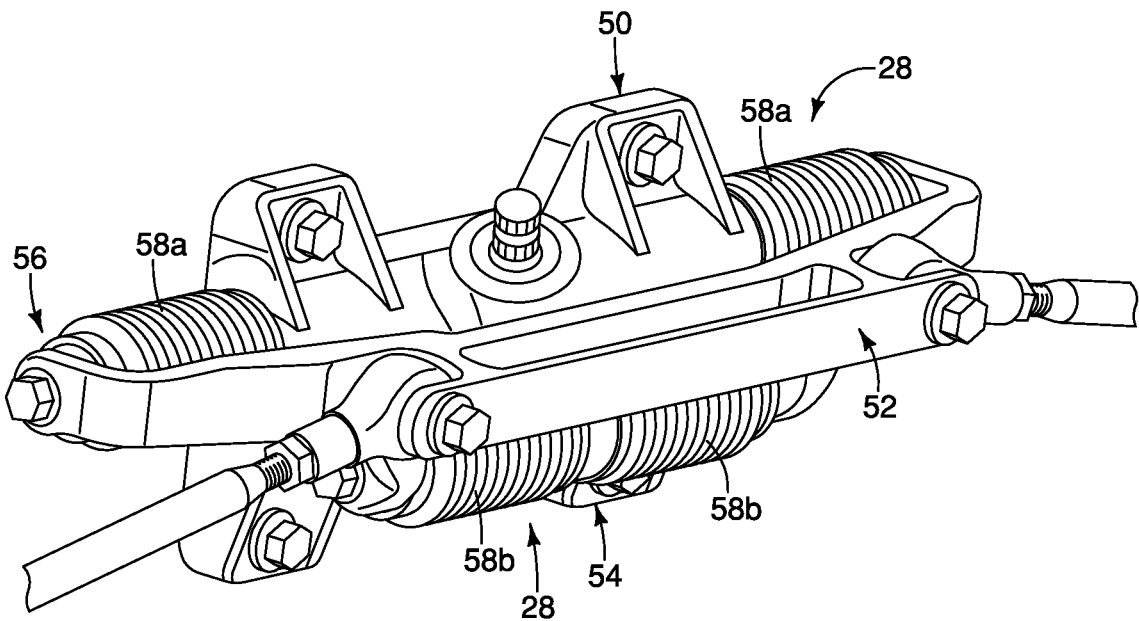
FIG. 11 is a top left perspective view of the steering assembly of the recreational off-highway vehicle illustrated in FIG. 1.
Figure 12:
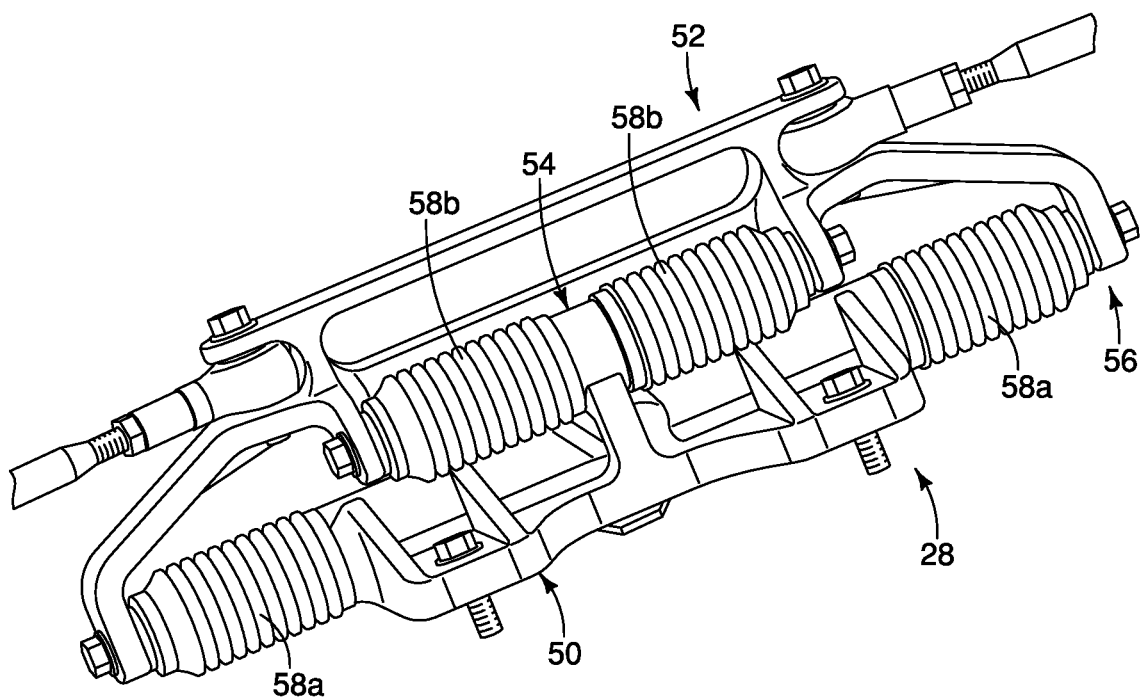
FIG. 12 is a bottom left perspective view of the steering assembly of the recreational off-highway vehicle illustrated in FIG. 1.
Figure 19:
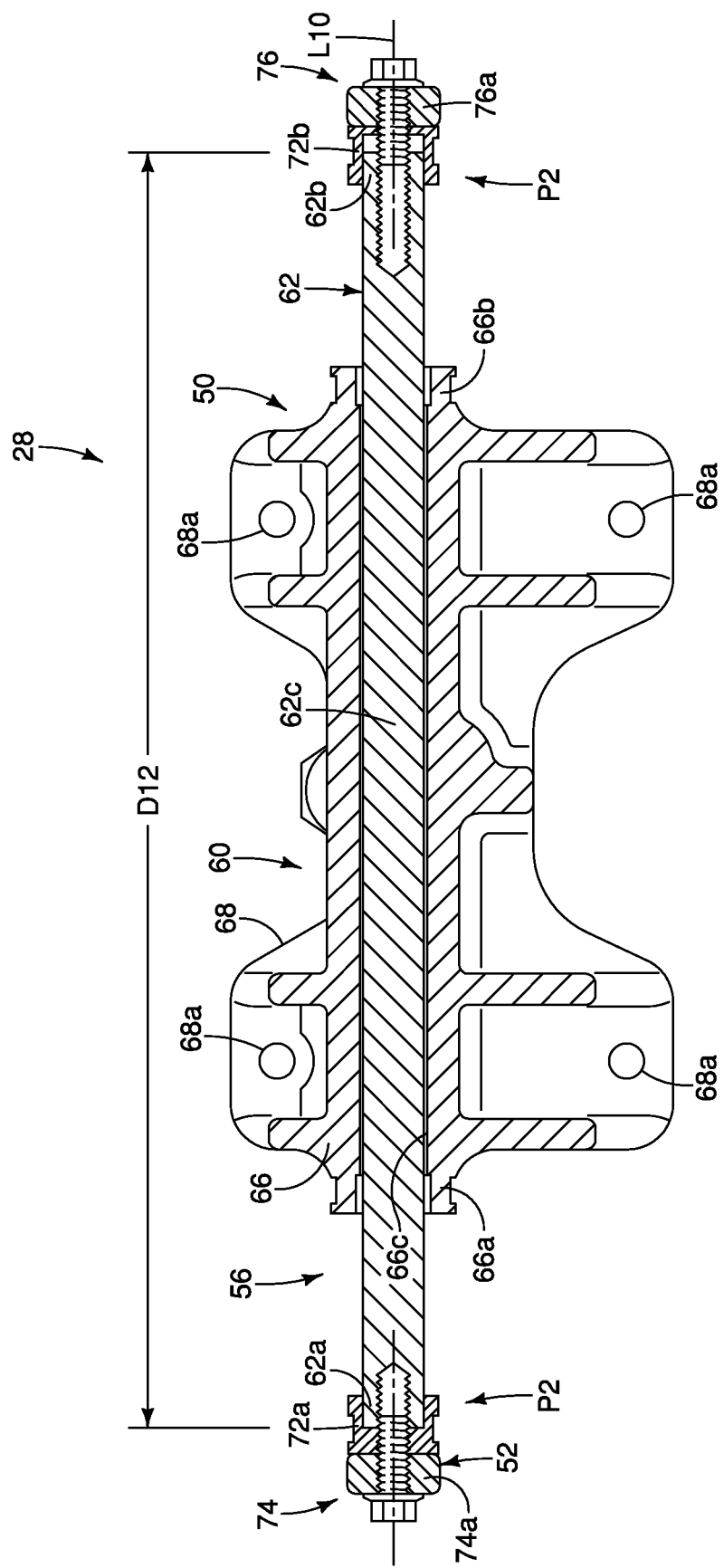
FIG. 19 is a cross sectional view of the steering assembly of the recreational off-highway vehicle illustrated in FIG. 1, taken along XIX-XIX line shown in FIG. 14.

As seen in FIG. 19, the steering rack 62 is a shaft member with a linear gear or rack. The steering rack 62 is made of a suitable rigid metallic material, such as cast iron, steel, aluminium, titanium, etc. The steering rack 62 extends through the inner bore 66c of the housing body 66. The steering rack 62 is slidably fitted with the inner bore 66c of the housing body 66 such that a longitudinal center axis L10 of the steering rack 62 coincides with the longitudinal center axis of the inner bore 66c of the housing body 66. In particular, the steering rack 62 is movably disposed with respect to the housing 60 in a lateral direction L3 of the steering assembly 28 along the longitudinal center axis L10 of the steering rack 62. In the illustrated embodiment, as seen in FIGS. 9 and 10, the steering assembly 28 is fixedly coupled to the front frame 12A of the vehicle frame 12 such that the longitudinal center axis L10 of the steering rack 62 is parallel to the lateral vehicle direction L2 of the vehicle 10. Thus, in the illustrated embodiment, the steering rack 62 is movably disposed with respect to the housing 60 in the lateral vehicle direction L2 of the vehicle 10.

Figure 16:
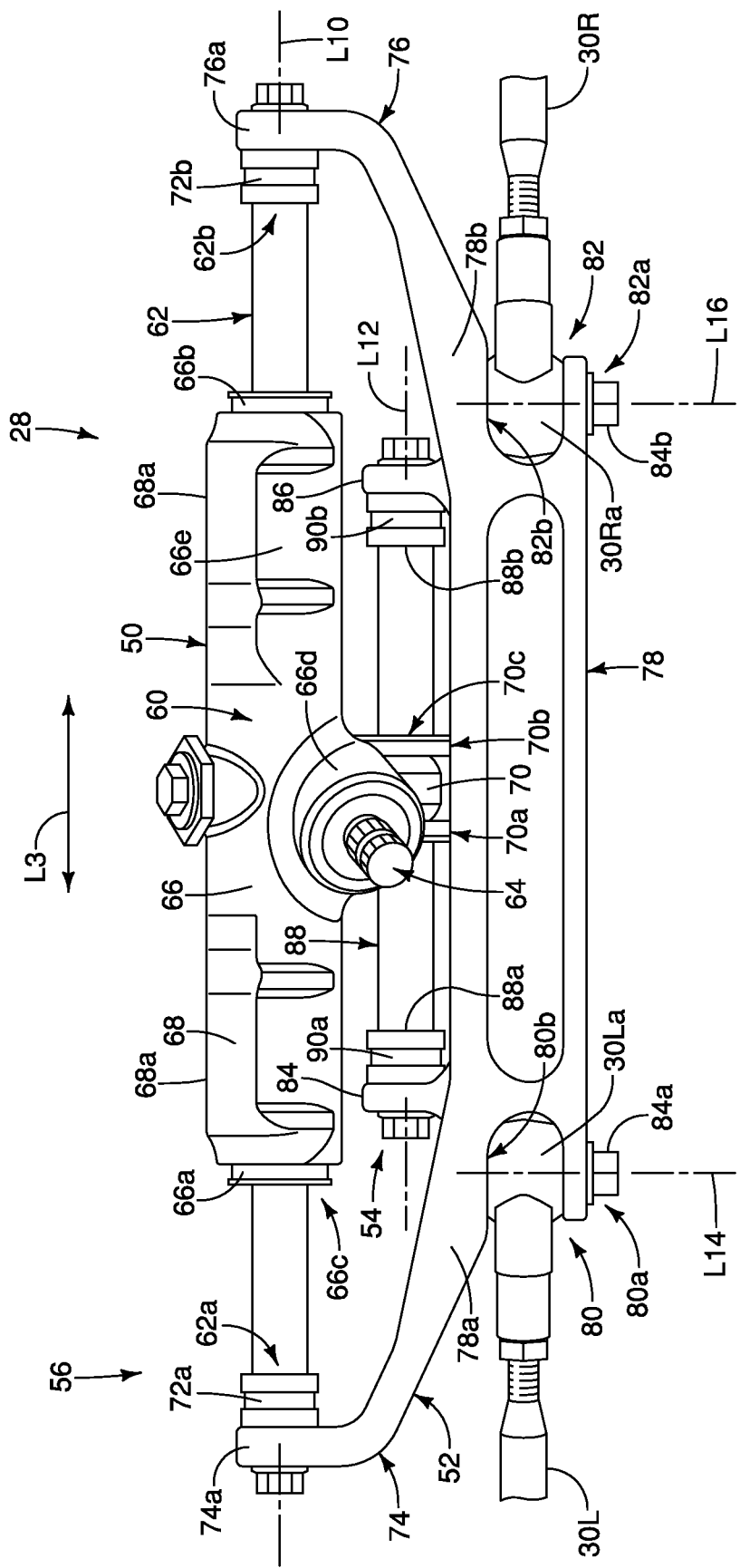
FIG. 16 is a top normal view of the steering assembly of the recreational off-highway vehicle illustrated in FIG. 1, illustrating a state in which rack boots and shaft boots are removed from the steering assembly and a state in which the steering assembly is located at a neutral position.

As seen in FIGS. 16 and 19, the steering rack 62 has a first or left rack end 62a and a second or right rack end 62b. Also, the steering rack 62 has a middle portion 62c disposed between the first rack end 62a and the second rack end 62b. The middle portion 62c of the steering rack 62 has gear teeth that mesh with gear teeth of the steering pinion 64. In the illustrated embodiment, a first or left stop 72a is fixedly attached to the first rack end 62a, while a second or right stop 72b is fixedly attached to the second rack end 62b. The first and second stops 72a and 72b are cylindrical metallic pieces that covers the first and second rack ends 62a and 62b, respectively. The first stop 72a and the second stop 72b have larger outer diameters than the outer diameter of the steering rack 62.

Figure 17:
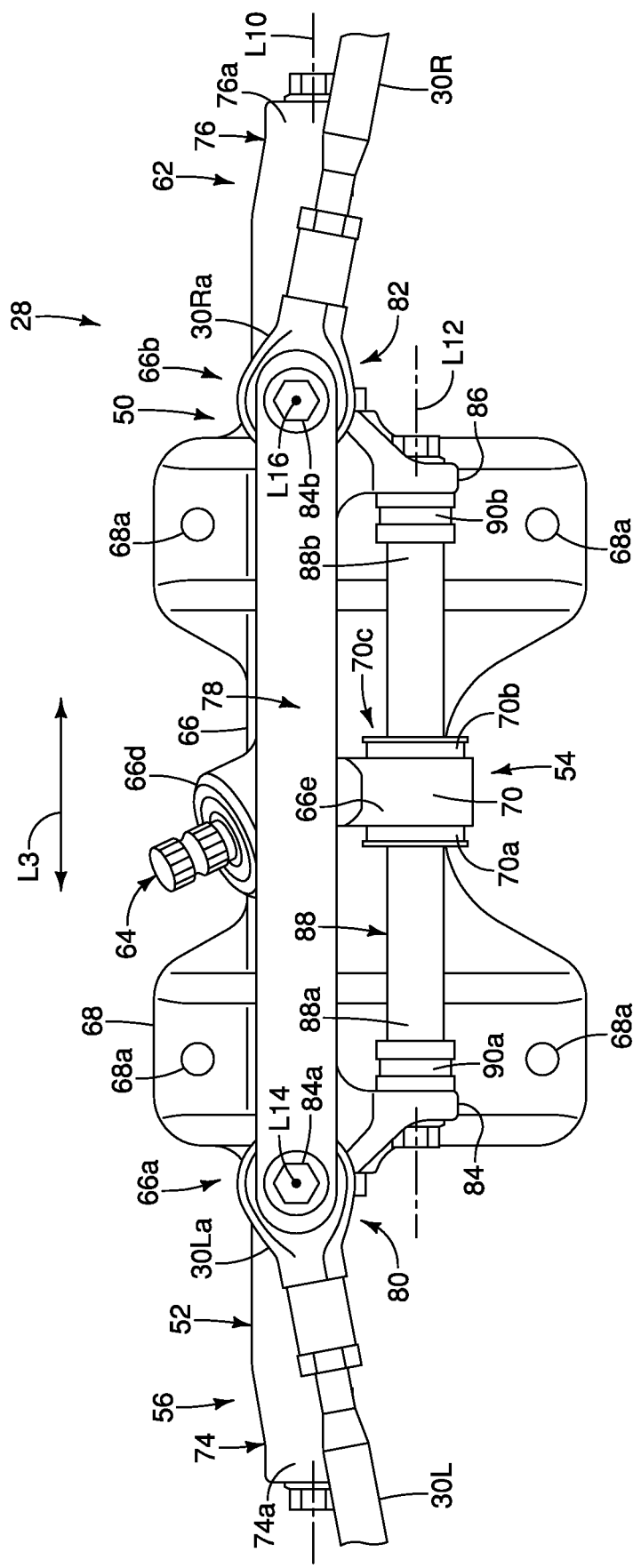
FIG. 17 is a rear normal view of the steering assembly of the recreational off-highway vehicle illustrated in FIG. 1, illustrating the state in which the rack boots and the shaft boots are removed from the steering assembly.
Figure 18:
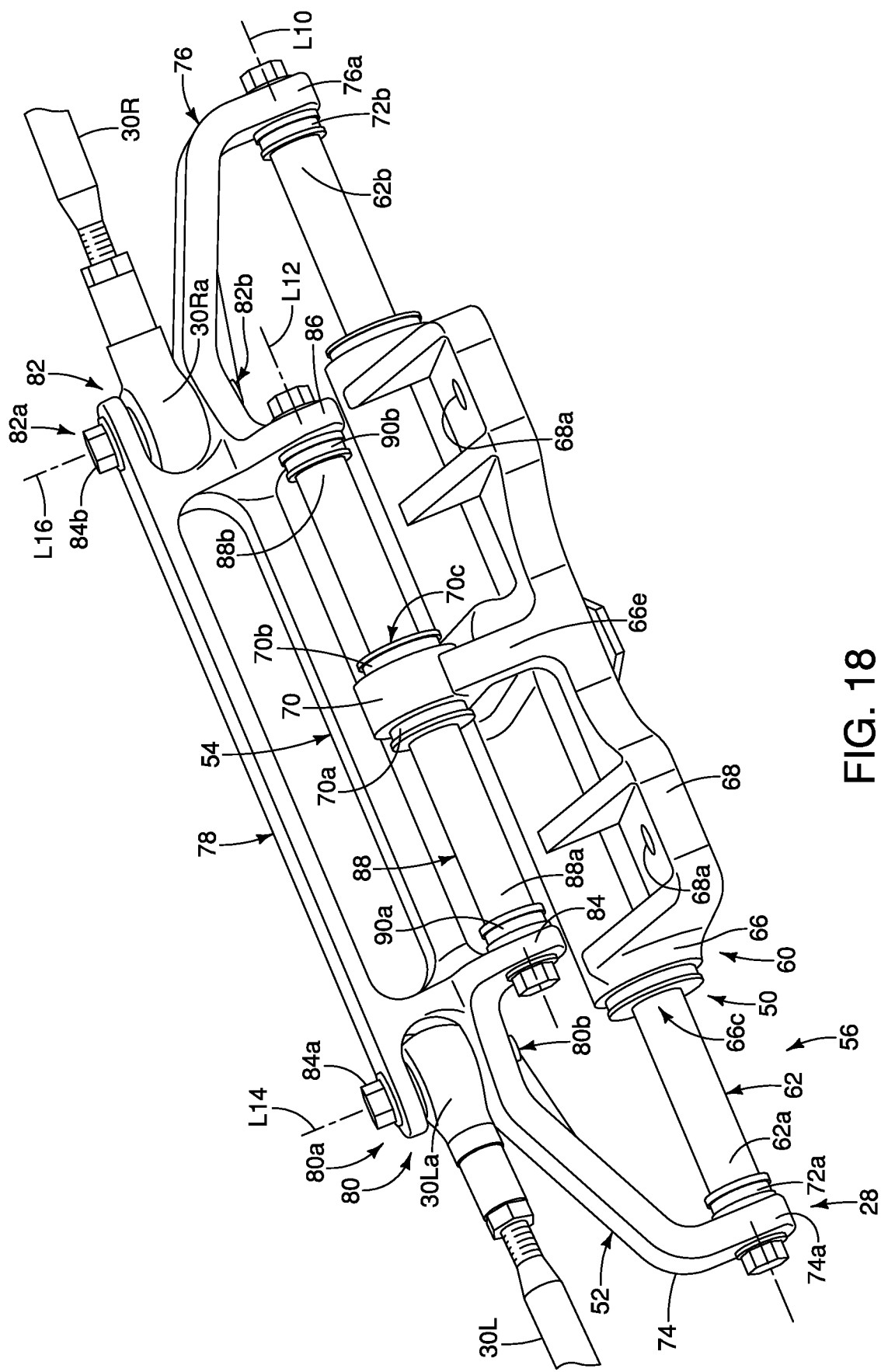
FIG. 18 is a bottom left perspective view of the steering assembly of the recreational off-highway vehicle illustrated in FIG. 1, illustrating the state in which the rack boots and the shaft boots are removed from the steering assembly.

As seen in FIGS. 16 to 18, the bracket 52 includes a first or left bracket part 74 and a second or right bracket part 76. The bracket 52 also includes a bridge part 78 that connects the first bracket part 74 and the second bracket part 76. The bracket 52 is made of a suitable rigid metallic material, such as cast iron, steel, aluminium, titanium, etc. The first bracket part 74, the second bracket part 76 and the bridge part 78 of the bracket 52 are preferably cast or otherwise formed as a one-piece, unitary member. For example, the bracket 52 can be formed by sheet metal with suitable rigidity. Thus, in the illustrated embodiment, the first bracket part 74 and the second bracket part 76 are integrally constructed as a single piece.

In the illustrated embodiment, the bracket 52 is coupled to the first rack end 62a of the steering rack 62. Also, the bracket 52 is coupled to the second rack end 62b of the steering rack 62. Specifically, the first bracket part 74 is connected to the first rack end 62a of the steering rack 62, and the second bracket part 76 is connected to the second rack end 62b of the steering rack 62. In the illustrated embodiment, a distal end 74a of the first bracket part 74 is fastened to the first rack end 62a of the steering rack 62 together with the first stop 72a using a fastener, such as a bolt, while a distal end 76a of the second bracket part 76 is fastened to the second rack end 62b of the steering rack 62 together with the second stop 72b using a fastener, such as a bolt. The first bracket part 74 outwardly and forwardly extends from a first or left end 78a of the bridge part 78, while the second bracket part 76 outwardly and forwardly extends from a second or right end 78b of the bridge part 78. Thus, in the illustrated embodiment, the bridge part 78 is disposed between the first bracket part 74 and the second bracket part 76 in the lateral direction L3 of the steering assembly 28.

The bridge part 78 of the bracket 52 includes a first or left tie rod connection 80. The bridge part 78 of the bracket 52 also includes a second tie rod connection 82. The tie rod 30L is operatively coupled to the steering assembly 28 at the first tie rod connection 80, while the tie rod 30R is operatively coupled to the steering assembly 28 at the second tie rod connection 82. Specifically, the first tie rod connection 80 includes a pair of a through hole 80a and a threaded hole 80b, while the second tie rod connection 82 includes a pair of a through hole 82a and a threaded hole 82b. The through hole 80a and the threaded hole 80b are concentrically arranged to each other along a center axis L14 of the first tie rod connection 80, while the through hole 82a and the threaded hole 82b are concentrically arranged to each other along a center axis L16 of the second tie rod connection 82. The first end 30La of the tie rod 30L is fastened to the steering assembly 28 at the first tie rod connection 80 with a bolt 84a that is inserted through the through hole 80a and an opening (see FIG. 21, for example) of the ball joint or rod end bearing provided to the first end 30La of the tie rod 30L and fastened to the threaded hole 80b. Similarly, the first end 30Ra of the tie rod 30R is fastened to the steering assembly 28 at the second tie rod connection 82 with a bolt 84b that is inserted through the through hole 82a and an opening the ball joint or rod end bearing provided to the first end 30Ra of the tie rod 30R and fastened to the threaded hole 82*b*.

The first tie rod connection 80 (e.g., the center axis L14 of the first tie rod connection 80) is located axially inward of the first rack end 62*a* and the second rack end 62*b* with respect to the longitudinal center axis L10 of the steering rack 62. Also, the second tie rod connection 82 (e.g., the center axis L16 of the second tie rod connection 82) is located axially inward of the first rack end 62*a* and the second rack end 62*b* with respect to the longitudinal center axis L10 of the steering rack 62. In the illustrated embodiment, the first tie rod connection 80 (e.g., the through hole 80*a* and the threaded hole 80*b*) is located rearward of the longitudinal center axis L10 of the steering rack 62 as viewed parallel to the longitudinal center axis L10 of the steering rack 62. Also, the second tie rod connection 82 (e.g., the through hole 82*a* and the threaded hole 82*b*) is located rearward of the longitudinal center axis L10 of the steering rack 62 as viewed parallel to the longitudinal center axis L10 of the steering rack 62.

Figure 20:
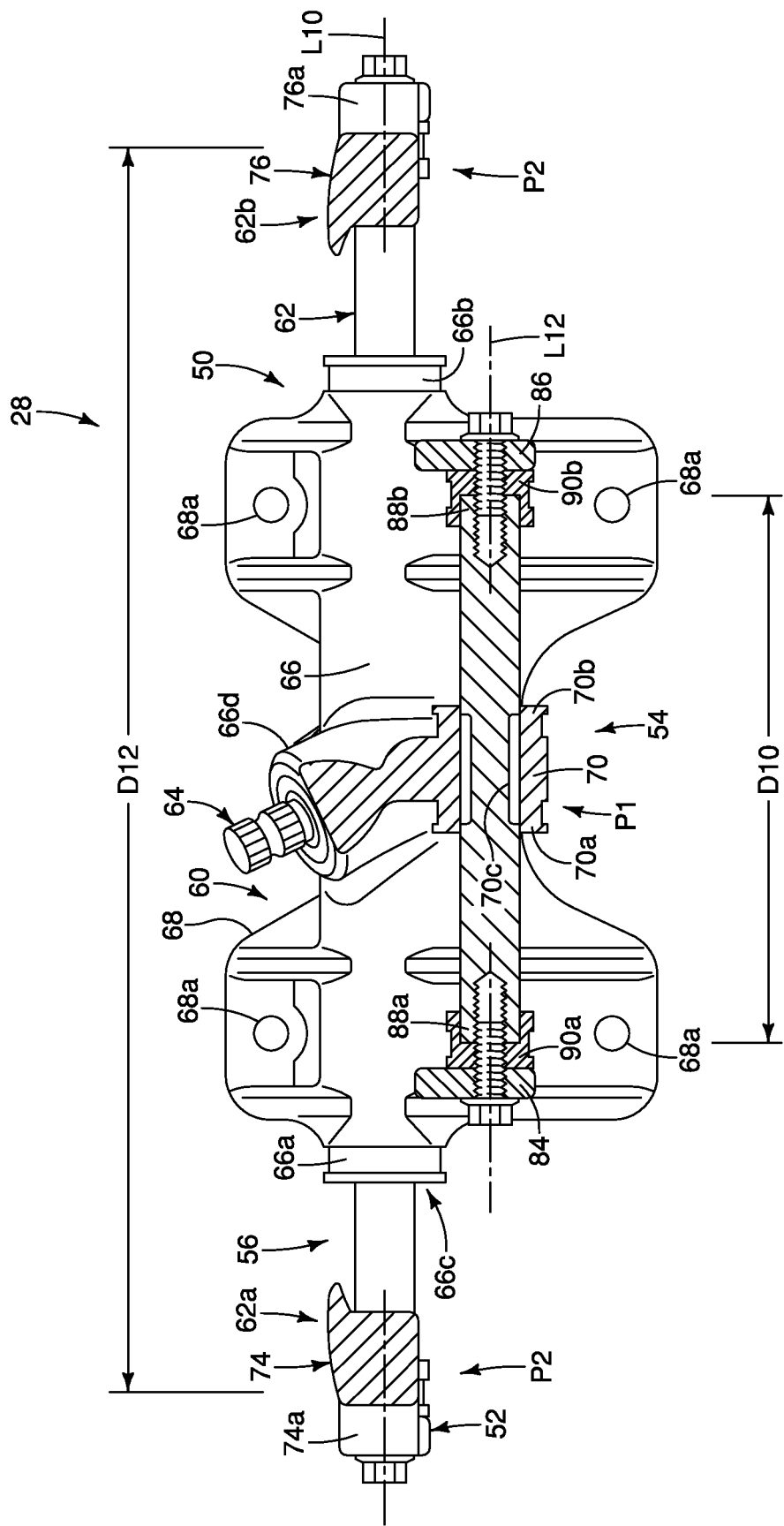
FIG. 20 is a cross sectional view of the steering assembly of the recreational off-highway vehicle illustrated in FIG. 1, taken along XX-XX line shown in FIG. 14.

The bracket 52 also includes a first or left shaft support 84 and a second or right shaft support 86. The first shaft support 84 and the second shaft support 86 extend forward and downward from the bridge part 78. The first shaft support 84 and the second shaft support 86 support a slide shaft 88 therebetween. The slide shaft 88 is made of a suitable rigid metallic material, such as cast iron, steel, aluminium, titanium, etc. The slide shaft 88 has a first or left shaft end 88*a* and a second or right shaft end 88*b*. The first shaft end 88*a* of the slide shaft 88 is covered by an end piece 90*a*, and is fastened to the first shaft support 84 together with the end piece 90*a* using a fastener, such as a bolt. The second shaft end 88*b* of the slide shaft 88 is covered by an end piece 90*b*, and is fastened to the second shaft support 86 together with the end piece 90*b* using a fastener, such as a bolt. The slide shaft 88 is partially covered by the holder 70. Specifically, the slide shaft 88 extends through the inner bore 70*c* of the holder 70. The slide shaft 88 is slidably fitted with the inner bore 70*c* of the holder 70 such that a longitudinal center axis L12 of the slide shaft 88 coincides with the longitudinal center axis of the inner bore 70*c* of the holder 70. Thus, in the illustrated embodiment, the slide shaft 88 is provided to the bracket 52 and arranged parallel to the longitudinal center axis L10 of the steering rack 62. In the illustrated embodiment, as seen in FIGS. 19 and 20, the slide shaft 88 has an axial length D10 that is shorter than an axial length D12 of the steering rack 62. Also, the slide shaft 88 is located axially inward of the first rack end 62*a* and the second rack end 62*b* with respect to the longitudinal center axis L10 of the steering rack 62. Thus, the holder 70 is also located axially inward of the first rack end 62*a* and the second rack end 62*b* with respect to the longitudinal center axis L10 of the steering rack 62.

Figure 21:
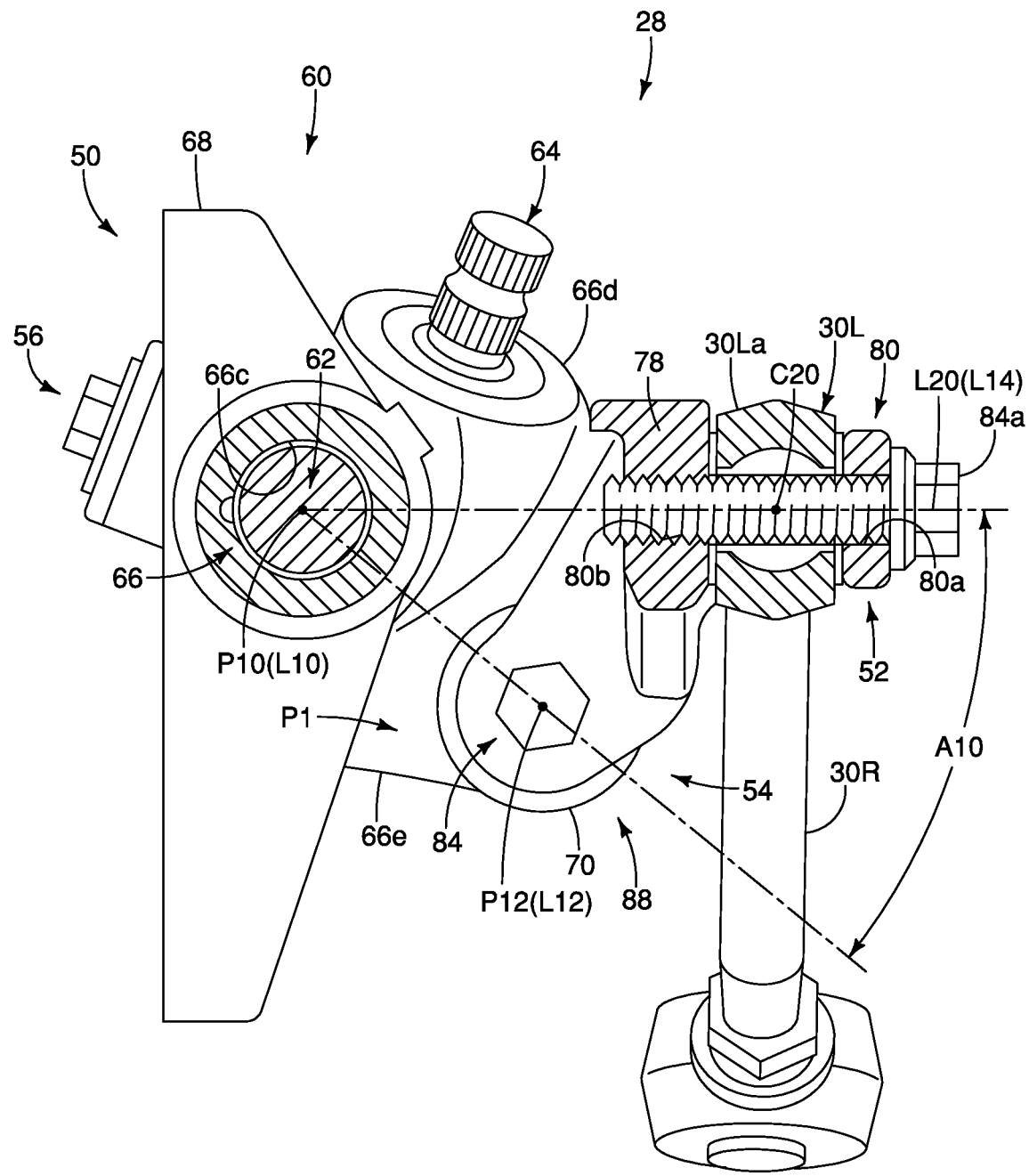
FIG. 21 is a cross sectional view of the steering assembly of the recreational off-highway vehicle illustrated in FIG. 1, taken along XXI-XXI line shown in FIG. 14.
Figure 22:
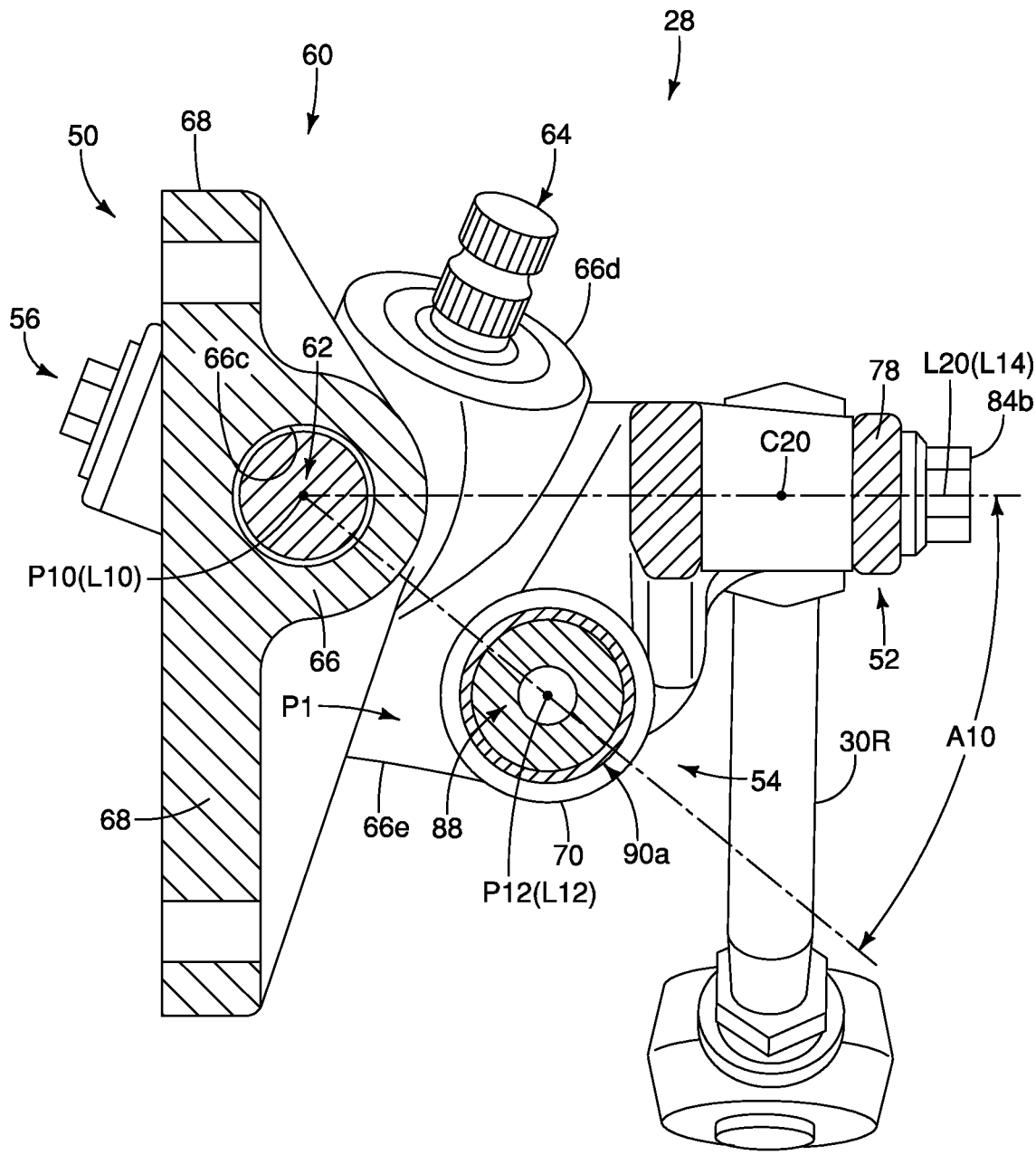
FIG. 22 is a cross sectional view of the steering assembly of the recreational off-highway vehicle illustrated in FIG. 1, taken along XXII-XXII line shown in FIG. 14.

As seen in FIGS. 21 and 22, the first tie rod connection 80 and the slide shaft 88 are offset in a circumferential direction around the longitudinal center axis L10 of the steering rack 62 as viewed parallel to the longitudinal center axis L10 of the steering rack 62. Specifically, as seen in FIGS. 21 and 22, a center position C20 of the first tie rod connection 80 and a position P12 of the longitudinal center axis L12 of the slide shaft 88 are offset in the circumferential direction by an offset angle A10 around the longitudinal center axis L10 of the steering rack 62 as viewed parallel to the longitudinal center axis L10 of the steering rack 62. Here, the center position C20 of the first tie rod connection 80 is located at the center of the ball joint or rod end bearing provided to the first end 30La of the tie rod 30L, for example. Similarly, the second tie rod connection 82 and the slide shaft 88 are offset in the circumferential direction around the longitudinal center axis L10 of the steering rack 62 as viewed parallel to the longitudinal center axis L10 of the steering rack 62. Specifically, a center position of the second tie rod connection 82 and a position of the longitudinal center axis L12 of the slide shaft 88 are offset in the circumferential direction by an offset angle around the longitudinal center axis L10 of the steering rack 62 as viewed parallel to the longitudinal center axis L10 of the steering rack 62. Here, the center position of the second tie rod connection 82 is located at the center of the ball joint or rod end bearing provided to the first end 30Ra of the tie rod 30R, for example.

In the illustrated embodiment, as seen in FIGS. 21 and 22, the slide shaft 88 is located below a line L20 that connects the center position C20 of the first tie rod connection 80 and a position P10 of the longitudinal center axis L10 of the steering rack 62 as viewed parallel to the longitudinal center axis L10 of the steering rack 62. In the illustrated embodiment, the line L20 coincides with the center axis L14 of the first tie rod connection 80. Thus, in the illustrated embodiment, the center axis L14 of the first tie rod connection 80 intersects with the steering rack 62. Similarly, the slide shaft 88 is located below a line that connects the center position of the second tie rod connection 82 and the position of the longitudinal center axis L10 of the steering rack 62 as viewed parallel to the longitudinal center axis L10 of the steering rack 62. In the illustrated embodiment, this line coincides with the center axis L16 of the second tie rod connection 82. Thus, the center axis L16 of the second tie rod connection 82 intersects with the steering rack 62.

Figure 13:
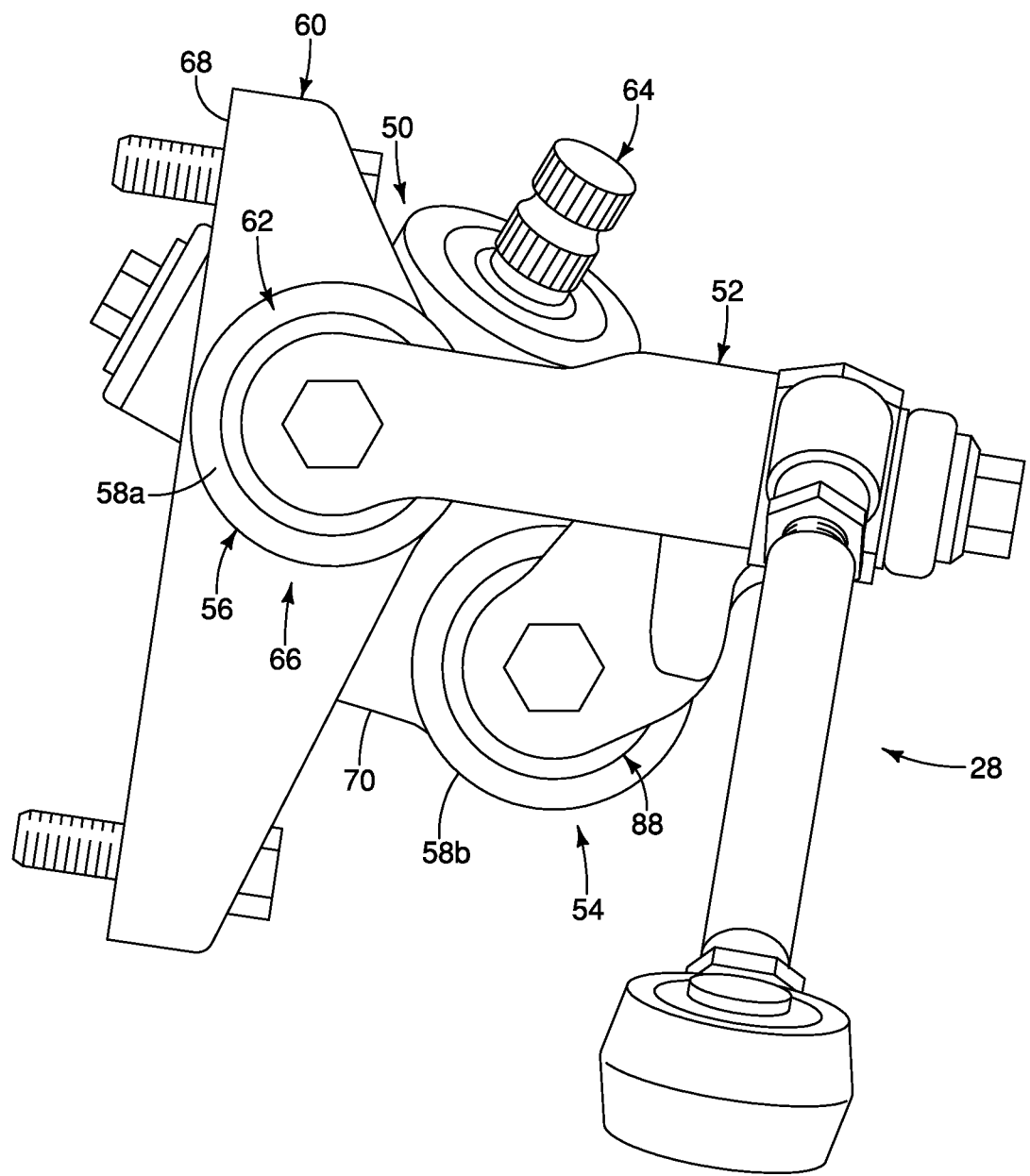
FIG. 13 is a left side elevational view of the steering assembly of the recreational off-highway vehicle illustrated in FIG. 1.
Figure 14:
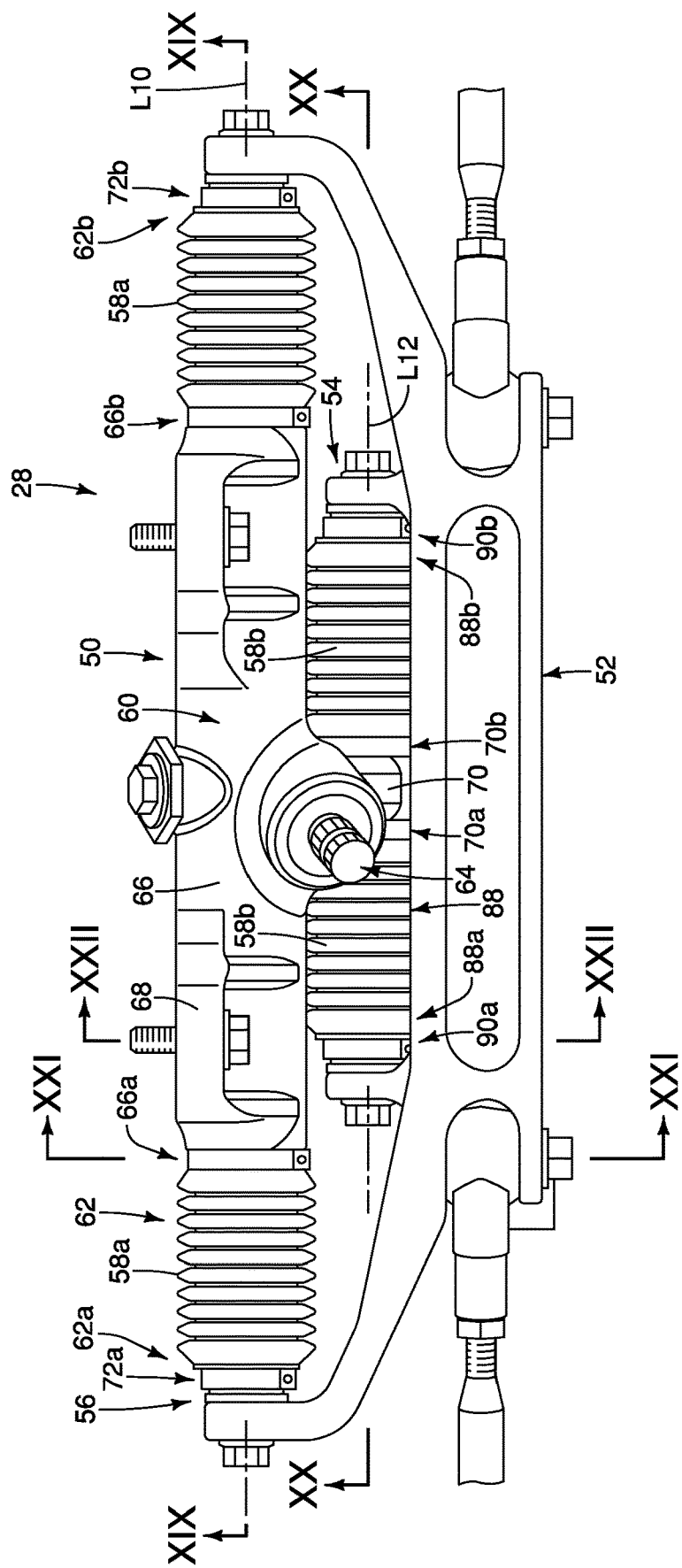
FIG. 14 is a top normal view of the steering assembly of the recreational off-highway vehicle illustrated in FIG. 1.
Figure 15:
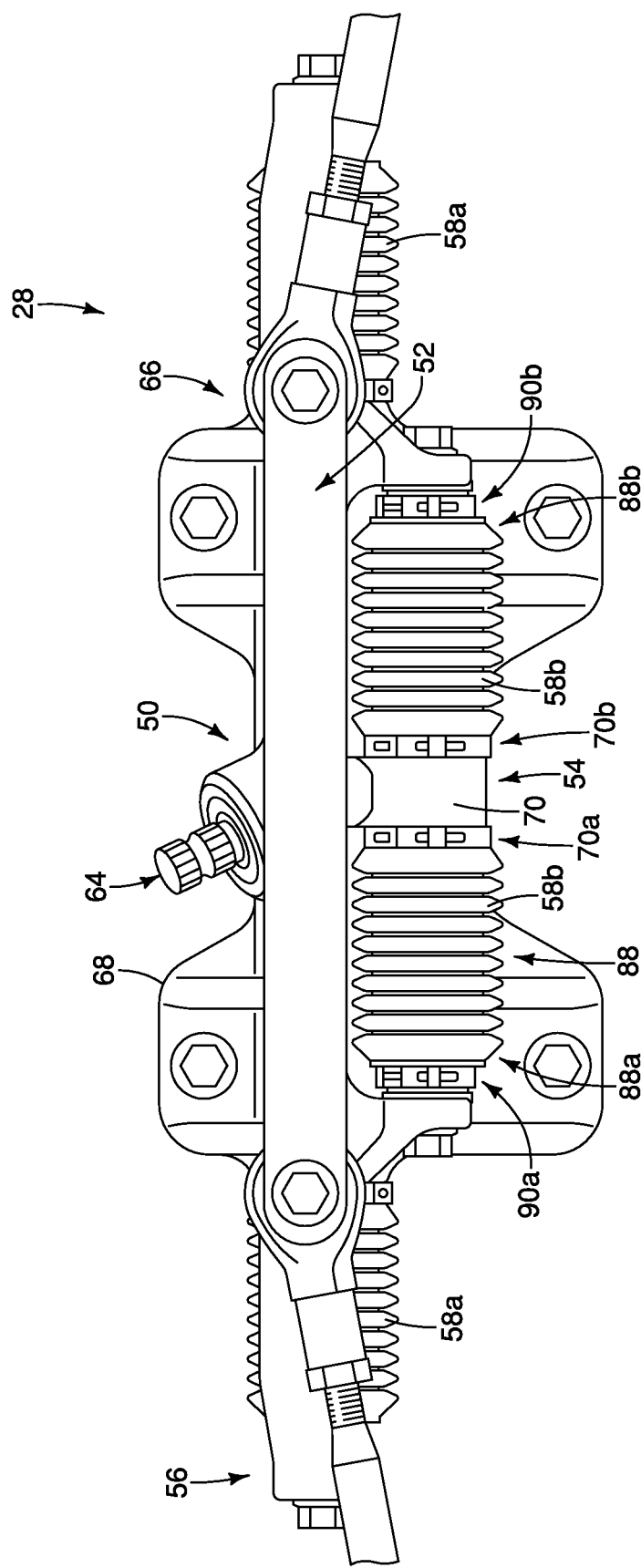
FIG. 15 is a rear normal view of the steering assembly of the recreational off-highway vehicle illustrated in FIG. 1.

As seen in FIGS. 13 to 15, the steering assembly 28 includes the steering rack boots 58*a* and the slide shaft boots 58*b*. The steering rack boots 58*a* and the slide shaft boots 58*b* are an expandable covering that is made of rubber or other suitable material. One of the steering rack boots 58*a* is fixedly coupled between the first axial end 66*a* of the housing body 66 and the first stop 72*a* attached to the first rack end 62*a* of the steering rack 62 so as to cover the first rack end 62*a* of the steering rack 62. The other of the steering rack boots 58*a* is fixedly coupled between the second axial end 66*b* of the housing body 66 and the second stop 72*b* attached to the second rack end 62*b* of the steering rack 62 so as to cover the second rack end 62*b* of the steering rack 62. With this configuration, the steering rack boots 58*a* create seals between the housing 60 and the steering rack 62 to avoid dirt and debris damaging the steering rack 62. Similarly, one of the slide shaft boots 58*b* is fixedly coupled between the first axial end 70*a* of the holder 70 and the end piece 90*a* attached to the first shaft end 88*a* of the slide shaft 88 so as to cover the first shaft end 88*a* of the slide shaft 88. The other of the slide shaft boots 58*b* is fixedly coupled between the second axial end 70*b* of the holder 70 and the end piece 90*b* attached to the second shaft end 88*b* of the slide shaft 88 so as to cover the second shaft end 88*a* of the slide shaft 88. With this configuration, the slide shaft boots 58*b* create seals between the holder 70 and the slide shaft 88 to avoid dirt and debris damaging the slide shaft 88.

With this configuration, the turning motion of the steering wheel 24 causes the steering pinion 64 of the steering assembly 28 to rotate which in turn move the steering rack 62 of the steering assembly 28 along the longitudinal center axis L10 of the steering rack 62 in the lateral vehicle direction L2. This translation motion of the steering rack 62 of the steering assembly 28 in the lateral vehicle direction L2 causes the bracket 52 that is coupled to the steering rack 62 to move in the lateral vehicle direction L2. This translation motion of the bracket 52 of the steering assembly 28 in the lateral vehicle direction L2 causes the tie rods 30L and 30R that are coupled to the bracket 52 to turn the knuckles 44L and 44R, respectively, for steering the vehicle 10.

Figure 23:
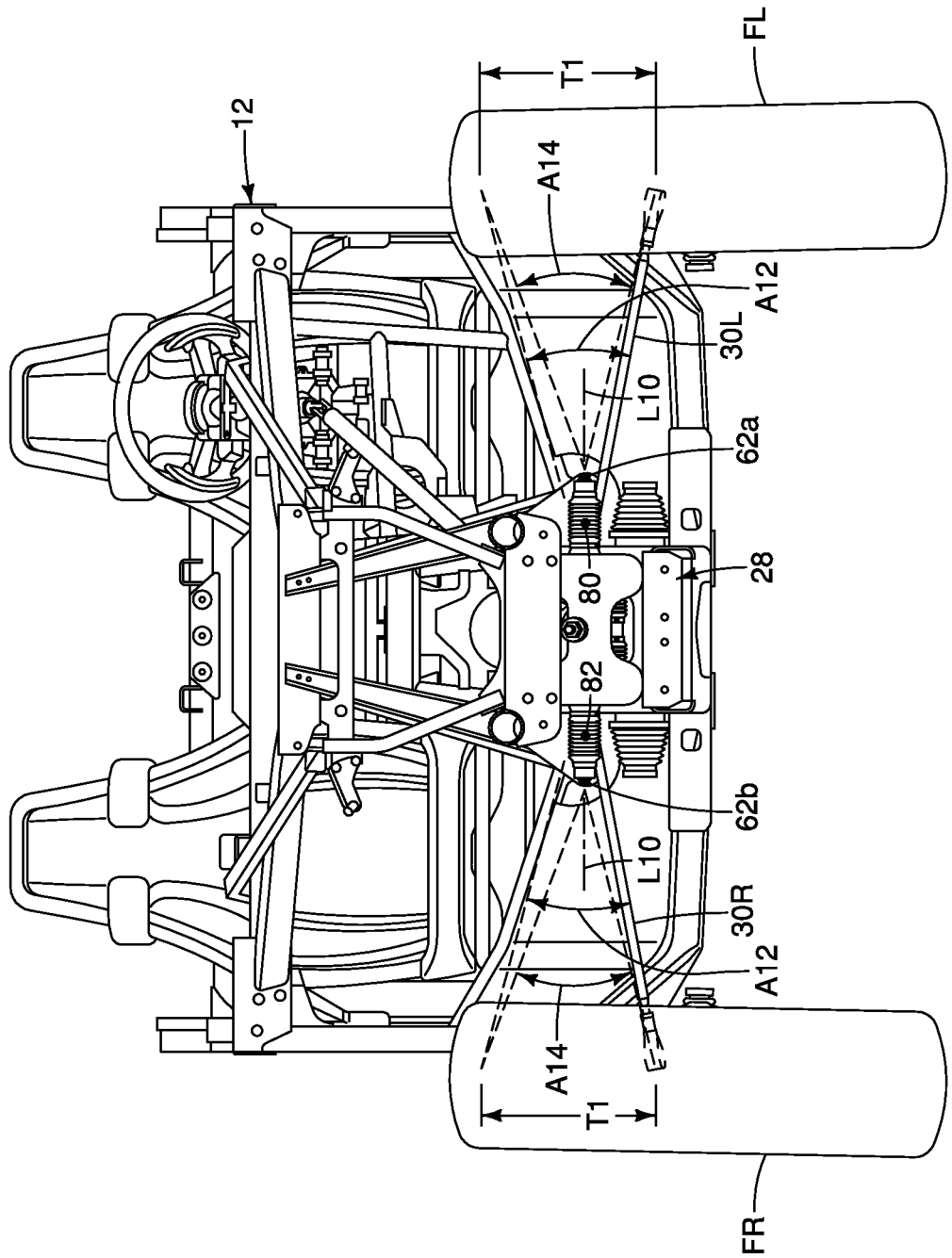
FIG. 23 is a partial front end elevational view of selected parts of the recreational off-highway vehicle illustrated in FIG. 1, illustrating a comparison of a working angle of tie rod for a predetermined wheel travel with the configuration of the illustrated embodiment relative to a working angle of tie rods for the predetermined wheel travel with a comparative configuration.

Furthermore, in the illustrated embodiment, the first tie rod connection 80 and the second tie rod connection 82 are located axially inward of the first rack end 62a and the second rack end 62b with respect to the longitudinal center axis L10 of the steering rack 62. In other words, with this configuration, tie rod connection positions are relocated axially inward with respect to the longitudinal center axis L10 of the steering rack 62, compared to a comparative configuration in which the tie rods 30L and 30R are coupled to the first and second rack ends 62a and 62b of the steering rack 62, respectively. Thus, as seen in FIG. 23, a working angle or range of motion A12 of the tie rods 30L and 30R for a predetermined wheel travel T1 with the configuration of the illustrated embodiment can be kept smaller than a working angle or range of motion A14 of the tie rods 30L and 30R with the comparative configuration in which the tie rods 30L and 30R are coupled to the first and second rack ends 62a and 62b, respectively. Thus, with the configuration of the illustrated embodiment, it is possible to achieve a larger wheel travel for larger-sized tires while maintaining a smaller working angle and a greater strength or stability of the ball joint or rod end bearings of the tie rods 30L and 30R. In particular, in the illustrated embodiment, with the bracket 52, the tie rod connection positions can be properly relocated. Thus, the orientations or angles of the tie rods 30L and 30R can also be optimized with respect to a required strength of the tie rods 30L and 30R and vice versa, which improves the structural reinforcement of the vehicle 10. Also, since the bracket 52 is disposed, as a separate part, between the steering rack 62 and the tie rods 30L and 30R, the specification of the bracket 52 can be changed easily, as needed and/or desired. Thus, the required orientations or angles of the tie rods 30L and 30R or the required strength of the tie rods 30L and 30R can be eased by optimizing the specification of the bracket 52.

In the illustrated embodiment, the rotational motion restriction structure 54 includes the slide shaft 88 provided to the bracket 52 and arranged parallel to the longitudinal center axis L10 of the steering rack 62. The rotational motion restriction structure 54 further includes the holder 70 integrally provided with the steering gearbox 50 and covering the slide shaft 88. In the illustrated embodiment, the steering rack 62 is slidably fitted with the inner bore 66c of the housing body 66 of the housing 60, and the slide shaft 88 is slidably fitted with the inner bore 70c of the holder 70. The cylindrical joint formed between the steering rack 62 and the housing body 66 allows them to rotate about and slide along the longitudinal center axis L10 of the steering rack 62, while the cylindrical joint formed between the slide shaft 88 and the holder 70 allows them to rotate about and slide along the longitudinal center axis L12 of the slide shaft 88. However, since the steering rack 62 and the side shaft 88 are rigidly linked by the bracket 52 as a single unit, the rotational motion of the assembly of the steering rack 62, the bracket 52 and the slide shaft 88 about the longitudinal center axis L10 or L12 is prevented and only the translational motion of this assembly along the longitudinal center axis L10 or L12 is allowed. Thus, the rotational motion restriction structure 54 is configured to restrict the rotational movement of the bracket 52 relative to the longitudinal center axis L10 of the steering rack 62. In particular, the rotational motion restriction structure 54 is configured to prevent the rotational movement of the bracket 52 about the longitudinal center axis L10 of the steering rack 62. With this configuration, the steering rack 62 is also prevented from rotating about the longitudinal center axis L10 of the steering rack 62, and thus the steering rack 62 can smoothly slide relative to the housing 60 for steering operation while properly mating with the steering pinion 64.

Figure 24:
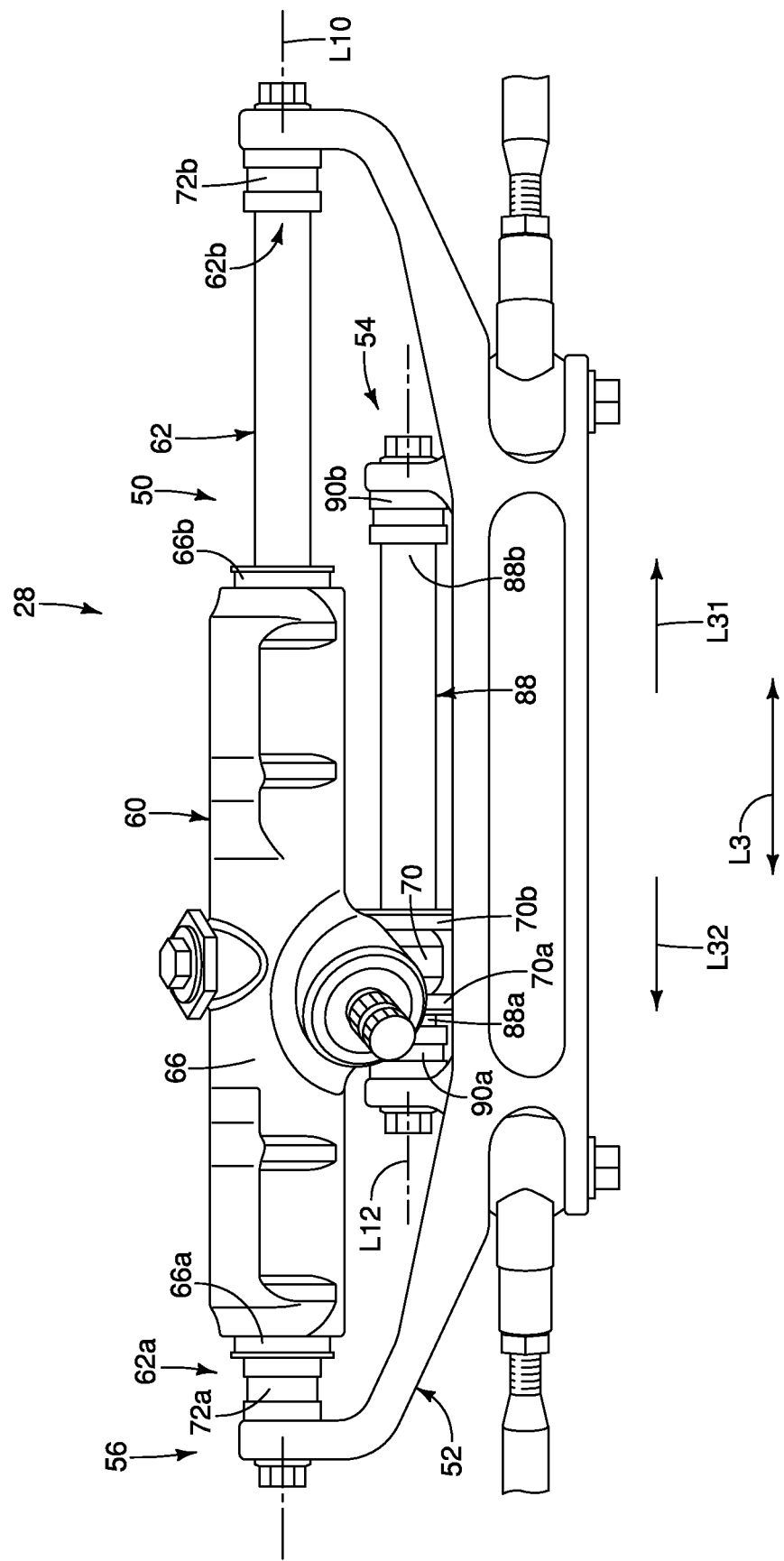
FIG. 24 is a top normal view of the steering assembly of the recreational off-highway vehicle illustrated in FIG. 1, illustrating a state in which the steering assembly is located at a right steering position.
Figure 25:
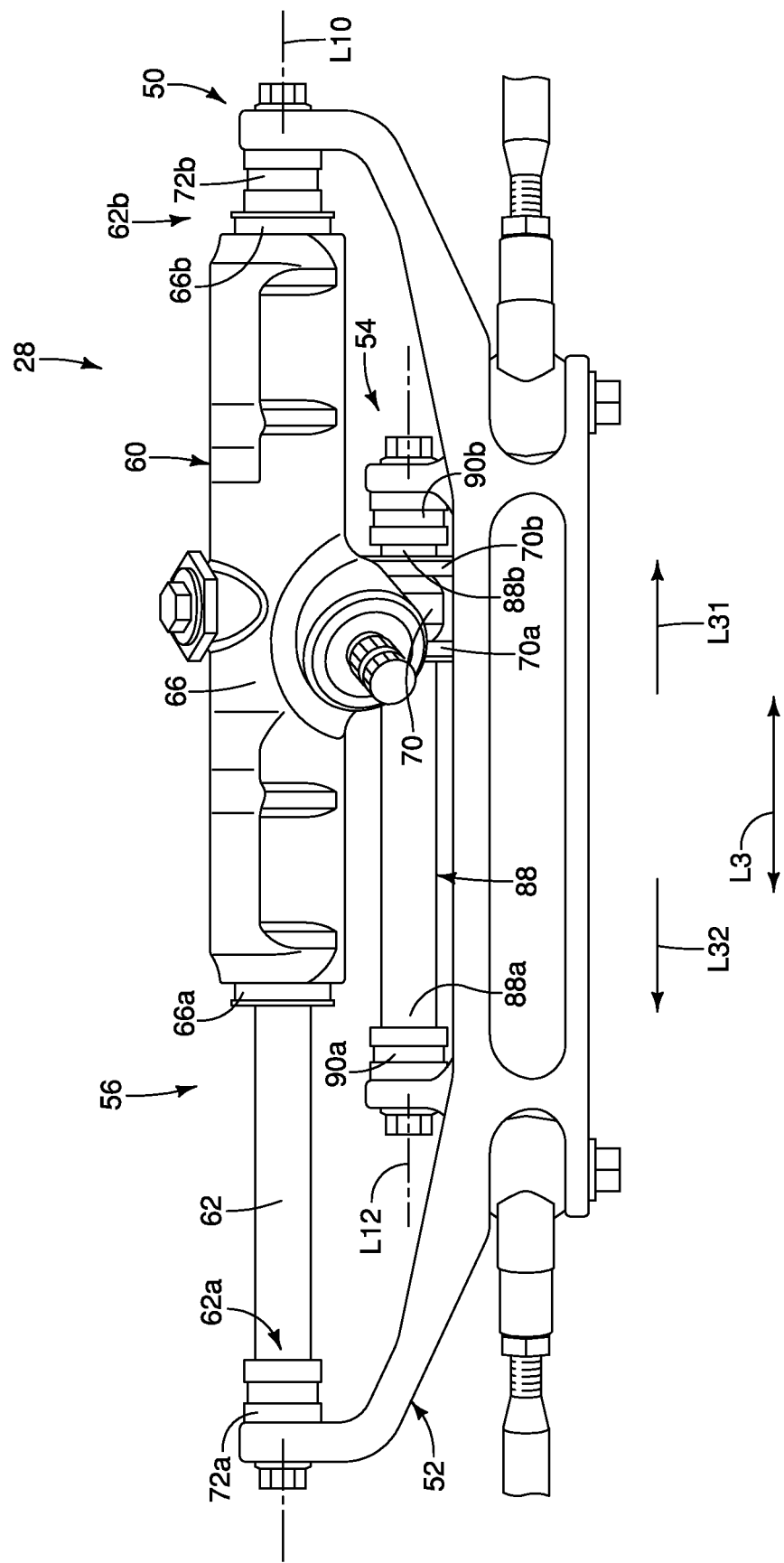
FIG. 25 is a top normal view of the steering assembly of the recreational off-highway vehicle illustrated in FIG. 1, illustrating a state in which the steering assembly is located at a left steering position.

In the illustrated embodiment, the translational motion restriction structure 56 includes the first stop 72a and the second stop 72b that are fixedly coupled to the first rack end 62a and the second rack end 62b of the steering rack 62, respectively. As seen in FIG. 24, the first stop 72a is configured to contact the first axial end 66a of the housing body 66 of the housing 60 to limit the translational movement of the steering rack 62 in a first or right lateral direction L31 of the lateral direction L3 along the longitudinal center axis L10 of the steering rack 62. Also, as seen in FIG. 25, the second stop 72b is configured to contact the second axial end 66b of the housing body 66 of the housing 60 to limit the translational movement of the steering rack 62 in a second or left lateral direction L32 of the lateral direction L3 that is opposite the first lateral direction L31 along the longitudinal center axis L10 of the steering rack 62. Thus, the translational motion restriction structure 56 is configured to limit the translational movement of the steering rack 62 along the longitudinal center axis L10 of the steering rack 62.

As seen in FIGS. 24 and 25, when the steering rack 62 is in a first or right lateral limit shown in FIG. 24, the first stop 72a contacts the first axial end 66a of the housing body 66 of the housing 60. On the other hand, when the steering rack 62 is in the first lateral limit shown in FIG. 24, the end piece 90a that is fixedly coupled to the first shaft end 88a of the slide shaft 88 does not contact the first axial end 70a of the holder 70. Similarly, when the steering rack 62 is in a second or left lateral limit shown in FIG. 25, the second stop 72b contacts the second axial end 66b of the housing body 66 of the housing 60. On the other hand, when the steering rack 62 is in the second lateral limit as shown in FIG. 25, the end piece 90b that is fixedly coupled to the second shaft end 88b of the slide shaft 88 does not contact the second axial end 70b of the holder 70. Thus, the rotational motion restriction structure 54, which includes the slide shaft 88 and the holder 70, is configured to not restrict the translational movement of the steering rack 62. In other words, the rotational motion restriction structure 54 is configured to allow translational movement of the steering rack 62 within the limits of the translational motion restriction structure 56.

In the illustrated embodiment, as seen in FIGS. 19 to 22, the rotational motion restriction structure 54 includes the slide shaft 88 and the holder 70, and thus the rotational motion restriction structure 54 is provided at a first location P1 where the slide shaft 88 is slidably fitted with the holder 70. On the other hand, the translational motion restriction structure 56 includes the first stop 72a and the second stop 72b, and thus the translational motion restriction structure 56 is provided at second locations P2 where the first stop 72a and the second stop 72b are fixedly coupled to the first rack end 62a and the second rack end 62b of the steering rack 62, respectively.

The first location P1 is different from the second locations P2, and is spaced apart from the second locations P2. In particular, as seen in FIGS. 21 and 22, the first location P1 is located adjacent to the longitudinal center axis L12 of the slide shaft 88 and offset radially from the longitudinal center axis L10 of the steering rack 62, while the second locations P2 are located adjacent to the longitudinal center axis L10 of the steering rack 62 and offset radially from the longitudinal center axis L12 of the slide shaft 88. Thus, the first location P1 and the second locations P2 are located at different radial locations with respect to the longitudinal center axis L10 of the steering rack 62 or with respect to the longitudinal center axis L12 of the slide shaft 88.

Thus, in the illustrated embodiment, the rotational motion restriction structure 54 and the translational motion restriction structure 56 are located at different locations. Specifically, the rotational motion restriction structure 54 and the translational motion restriction structure 56 are located at different radial locations with respect to the longitudinal center axis L10 of the steering rack 62. In particular, the rotational motion restriction structure 54 is provided at the first location P1 offset radially from the longitudinal center axis L10 of the steering rack 62. The translational motion restriction structure 56 is provided at the second locations P2 radially closer to the longitudinal center axis L10 of the steering rack 62 than the first location P1.

Furthermore, as seen in FIGS. 19 and 20, the first location P1 is located adjacent to a lateral center portion of the steering assembly 28 with respect to the longitudinal center axis L10 of the steering rack 62, while the second locations P2 are located adjacent to lateral end portions of the steering assembly 28 with respect to the longitudinal center axis L10 of the steering rack 62. Thus, the first location P1 and the second locations P2 are located at different axial locations with respect to the longitudinal center axis L10 of the steering rack 62 or with respect to the longitudinal center axis L12 of the slide shaft 88. In particular, the first location P1 is located axially inward of the second locations P2 with respect to the longitudinal center axis L10 of the steering rack 62 or with respect to the longitudinal center axis L12 of the slide shaft 88.

The vehicle 10 further comprises many other conventional vehicle components, such as an accelerator pedal, a brake system, a radiator, a radiator fan, a fuel tank, an electrical system, an exhaust system, various lights, various displays, gauges, etc. that are typically provided on recreational off-highway vehicles. However, for the sake of brevity, only those vehicle components needed to understand the present invention will be illustrated and/or discussed herein.

In the illustrated embodiment, an example is shown in which the steering assembly 28 includes the steering gearbox 50 with a mechanical rack-and-pinion steering, but the present application is not limited to this. The steering gearbox 50 of the steering assembly 28 can include different types of steering racks, such as a hydraulic power steering rack with a hydraulic pump for assist, an electric power steering rack with an electric motor for assist, etc. Also, the steering gearbox 50 of the steering assembly 28 can include different types of steering, such as a recirculating-ball steering, etc. Regardless of the types of the steering gearbox 50, the bracket 52 can be provided between the steering gearbox 50 and the tie rods 30L and 30R.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a vehicle in an upright, riding position and equipped with the steering assembly.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A steering assembly comprising: a steering gearbox including a housing having a hollow housing body with a first axial end and a second axial end, and
a steering rack movably disposed with respect to the housing in a lateral direction,
the steering rack having a first rack end and a second rack end and extending through the first axial end and the second axial end of the housing body;
a bracket coupled to the first rack end of the steering rack, the bracket including a first tie rod connection located axially inward of the first rack end and the second rack end with respect to a longitudinal center axis of the steering rack; a rotational motion restriction structure configured to restrict rotational movement of the bracket relative to the longitudinal center axis of the steering rack; and a translational motion restriction structure configured to limit translational movement of the steering rack along the longitudinal center axis of the steering rack, the rotational motion restriction structure and the translational motion restriction structure being located at different locations, and the translational motion restriction structure including a first stop configured to contact the first axial end of the housing body to limit the translational movement of the steering rack in a first lateral direction, and a second stop configured to contact the second axial end of the housing body to limit the translational movement of the steering rack in a second lateral direction that is opposite the first lateral direction.

2. The steering assembly according to claim 1, wherein the rotational motion restriction structure and the translational motion restriction structure are located at different radial locations with respect to the longitudinal center axis of the steering rack.

3. The steering assembly according to claim 1, wherein the rotational motion restriction structure is provided at a first location offset radially from the longitudinal center axis of the steering rack, and
the translational motion restriction structure is provided at a second location radially closer to the longitudinal center axis of the steering rack than the first location.

4. The steering assembly according to claim 1, wherein the bracket includes a first bracket part connected to the first rack end, and a second bracket part connected to the second rack end.

5. The steering assembly according to claim 1, wherein the first bracket part and the second bracket part are integrally constructed as a single piece.

6. The steering assembly according to claim 1, wherein the rotational motion restriction structure is configured to not restrict the translational movement of the steering rack, and is configured to prevent the rotational movement of the bracket about the longitudinal center axis of the steering rack.

7. The steering assembly according to claim 1, wherein the rotational motion restriction structure includes a slide shaft provided to the bracket and arranged parallel to the longitudinal center axis of the steering rack.

8. The steering assembly according to claim 7, wherein the slide shaft has an axial length that is shorter than an axial length of the steering rack.

9. The steering assembly according to claim 7, wherein the slide shaft is located axially inward of the first rack end and the second rack end with respect to the longitudinal center axis of the steering rack.

10. The steering assembly according to claim 7, wherein the rotational motion restriction structure further includes a holder integrally provided with the steering gearbox and covering the slide shaft.

11. The steering assembly according to claim 10, wherein the holder is located axially inward of the first rack end and the second rack end with respect to the longitudinal center axis of the steering rack.

12. The steering assembly according to claim 1, wherein the first tie rod connection is located rearward of the longitudinal center axis of the steering rack as viewed parallel to the longitudinal center axis of the steering rack.

13. A steering assembly comprising:
a steering gearbox including a housing and a steering rack movably disposed with respect to the housing in a lateral direction, the steering rack having a first rack end and a second rack end;
a bracket coupled to the first rack end of the steering rack, the bracket including a first tie rod connection located axially inward of the first rack end and the second rack end with respect to a longitudinal center axis of the steering rack;
a rotational motion restriction structure configured to restrict rotational movement of the bracket relative to the longitudinal center axis of the steering rack; and
a translational motion restriction structure configured to limit translational movement of the steering rack along the longitudinal center axis of the steering rack,
the rotational motion restriction structure and the translational motion restriction structure being located at different locations,
the rotational motion restriction structure including a slide shaft provided to the bracket and arranged parallel to the longitudinal center axis of the steering rack,
the first tie rod connection of the bracket and the slide shaft being offset each other in a circumferential direction around the longitudinal center axis of the steering rack as viewed parallel to the longitudinal center axis of the steering rack, and
the first tie rod connection of the bracket and the slide shaft being radially offset each other with respect to a longitudinal center axis of the slide shaft as viewed parallel to the longitudinal center axis of the slide shaft.

14. The steering assembly according to claim 1, wherein the bracket includes a second tie rod connection located axially inward of the first rack end and the second rack end with respect to the longitudinal center axis of the steering rack.

* * * * *